(12) United States Patent
Lichti

(10) Patent No.: US 6,190,117 B1
(45) Date of Patent: *Feb. 20, 2001

(54) METHOD OF USING A TWO WAY HIGH SPEED STORAGE SYSTEM

(76) Inventor: Robert D. Lichti, P.O. Box 1489, Chester, CA (US) 96020

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/742,310

(22) Filed: Nov. 1, 1996

(51) Int. Cl.$^7$ .................................................. B65G 1/00
(52) U.S. Cl. ..................... 414/800; 414/254; 414/281; 414/331.03; 364/478.02; 211/1.51
(58) Field of Search ..................... 414/290, 254, 414/800, 273, 281, 806, 807, 808, 331.02, 331.03, 331.05, 331.1, 222.01; 198/833, 468.6; 211/1.51; 364/478.02

(56) References Cited

U.S. PATENT DOCUMENTS

| | | | |
|---|---|---|---|
| 3,809,263 | * 5/1974 | Dodd et al. | 414/223 |
| 4,547,343 | * 10/1985 | Takano et al. | 414/417 X |
| 4,561,820 | * 12/1985 | Matheny, III et al. | 414/331 |
| 4,983,091 | * 1/1991 | Lichti, Sr. et al. | 414/331 |
| 5,505,586 | 4/1996 | Lichti | 414/786 |
| 5,588,790 | 12/1996 | Lichti | 414/331 |

FOREIGN PATENT DOCUMENTS

| | | | |
|---|---|---|---|
| 3442161 | * 5/1986 | (DE) | 414/331 |
| 727456 | * 4/1980 | (SU) | 414/331 |
| 865718 | * 9/1981 | (SU) | 414/331 |

* cited by examiner

Primary Examiner—Frank E. Werner
(74) Attorney, Agent, or Firm—Bruce A. Jagger

(57) ABSTRACT

A two way operated storage system including a container storage area in the form of a multi-rack, multi-tier rotary storage carousel, a vertical lift for transporting containers vertically to a shuttle that transfers containers to and from the storage carousel. Storage carousel is supported on two straight tracks separated by a non-supporting distance. The rotary storage carousel and the shuttle are mechanically and synchronously interlocked such that the storage system can be operated in two different directions.

7 Claims, 21 Drawing Sheets

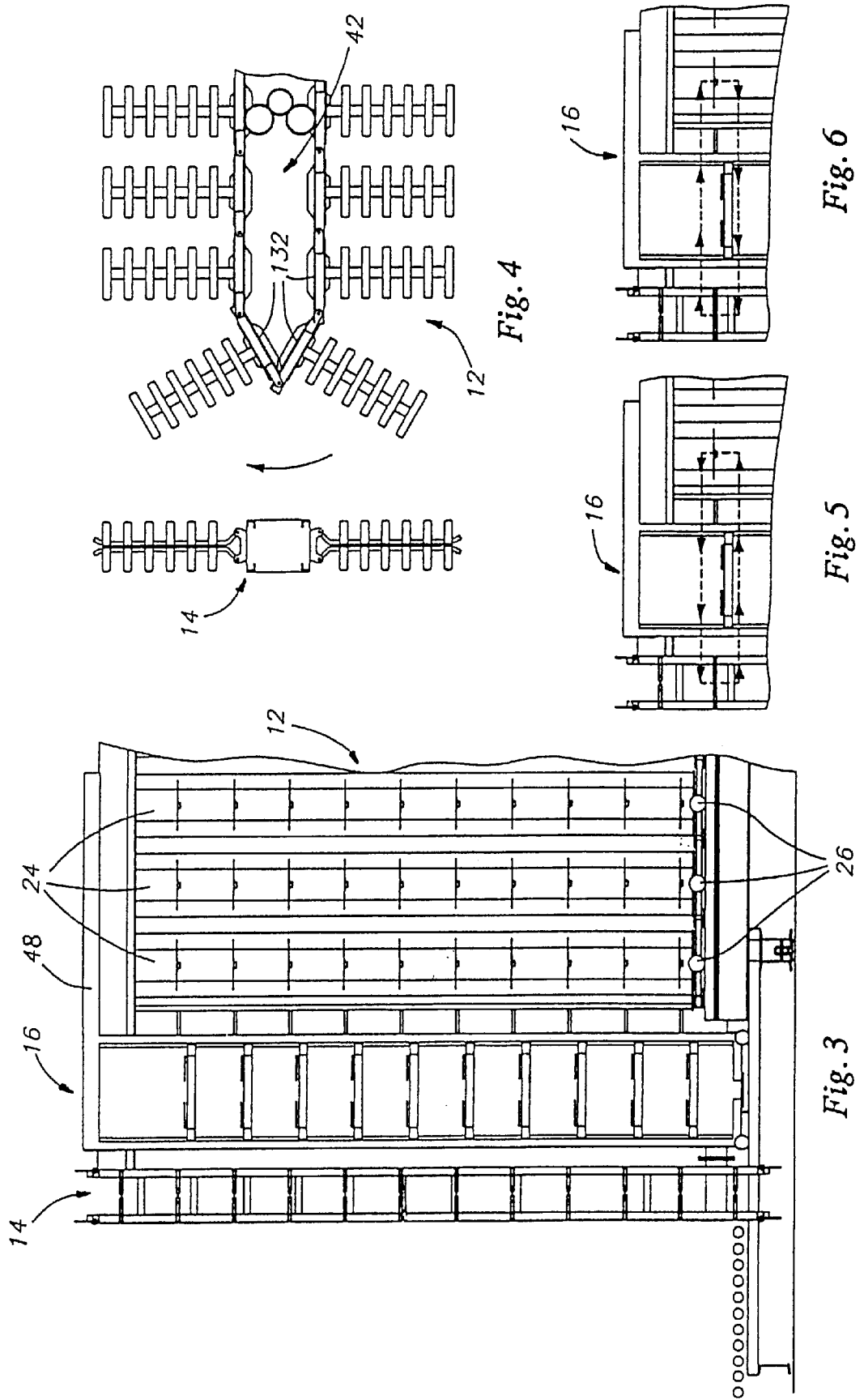

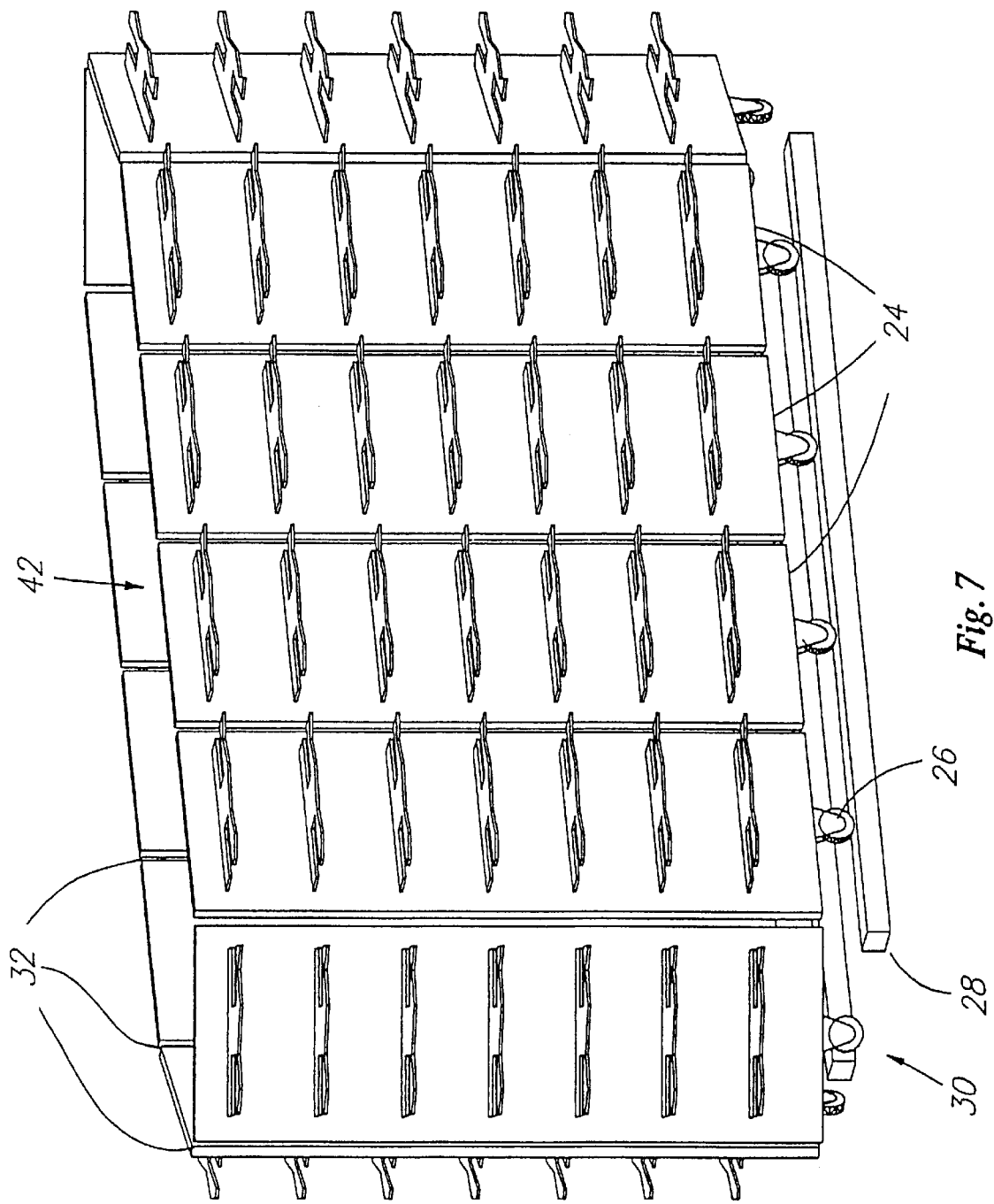

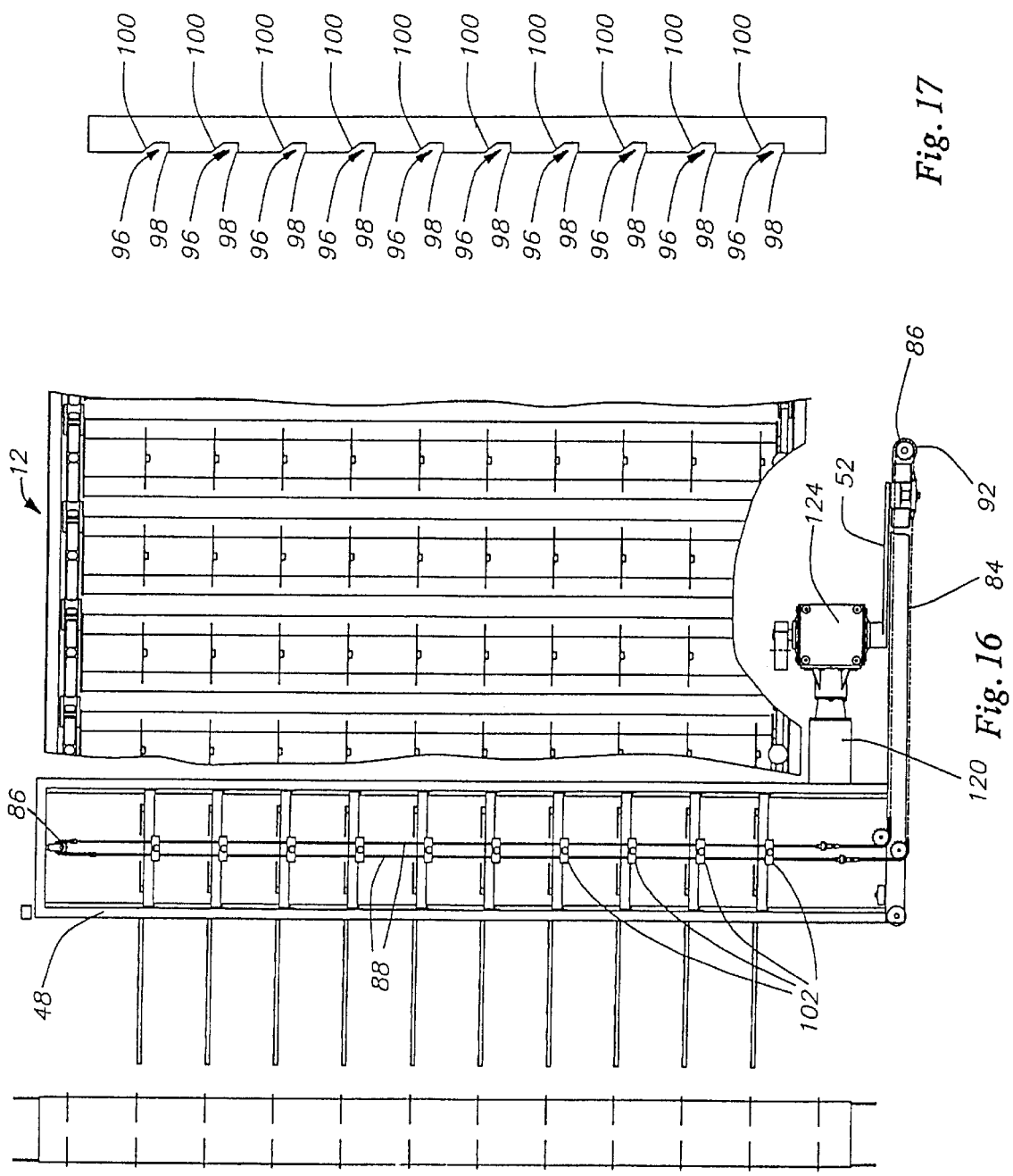

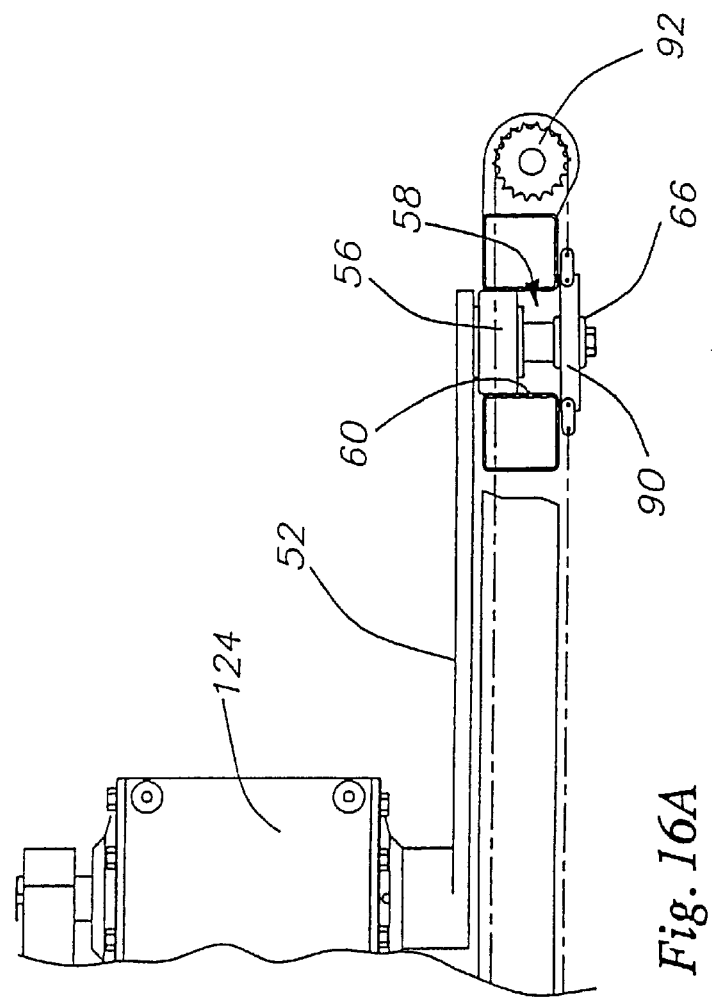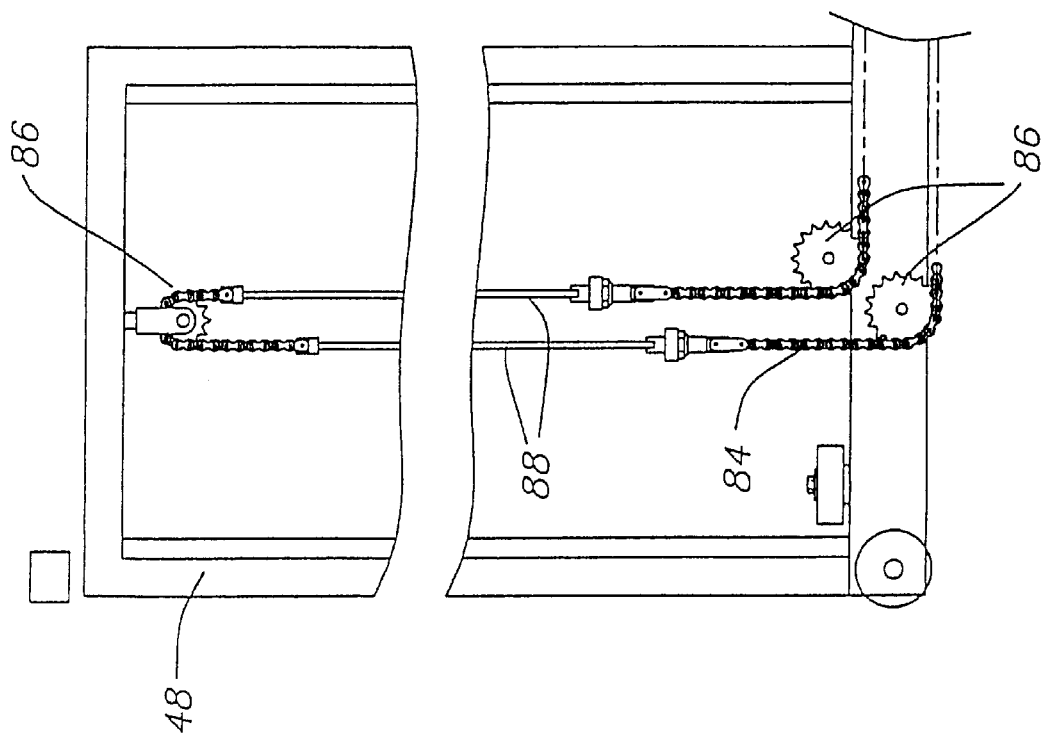
Fig. 16A

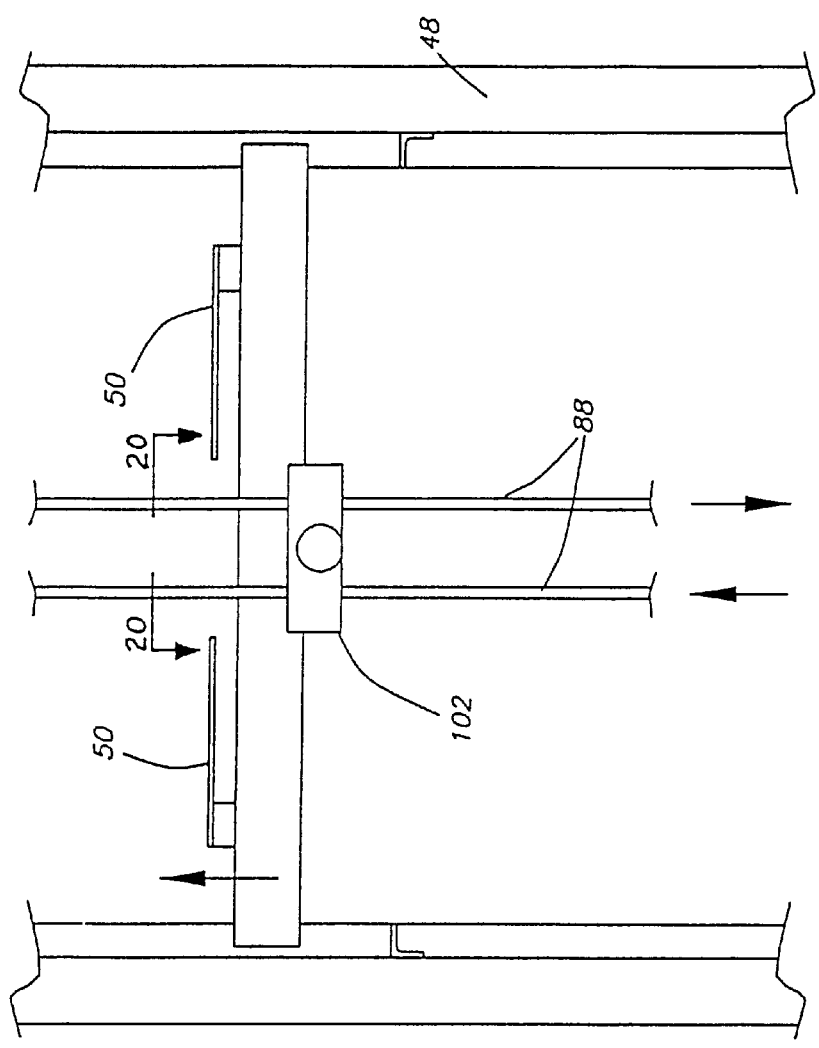
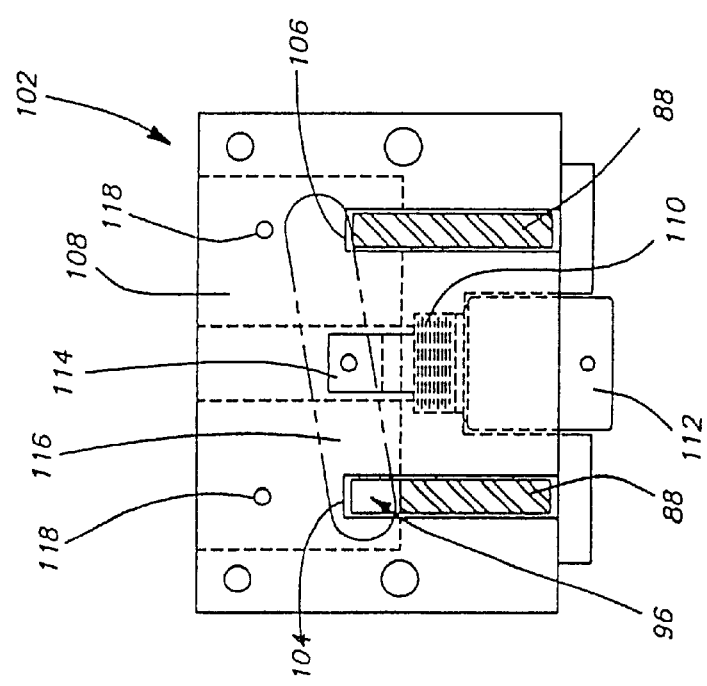
Fig. 21
Fig. 20

METHOD OF USING A TWO WAY HIGH SPEED STORAGE SYSTEM

BACKGROUND OF THE INVENTION

1. Field of the Invention

The invention relates in general to storage systems for storing and retrieving goods. In particular, the invention relates to a continuously rotating rotary storage carousel that rides on separate tracks that are spaced apart. In addition, the invention relates to a drive system mechanically interlocking and synchronizing the movement of a shuttle with a rotary storage carousel allowing the storage system to function the same regardless of the direction in which the drive system is operated. The invention also relates to a drive system mechanically interlocking and synchronizing the movement of a shuttle in conjunction with a rotary storage carousel and a continuous vertical lift operating on a single power source. Finally, the present invention relates to an improved intermeshing shelf and fork configuration capable of lifting and moving various sized containers not otherwise liftable by conventional storage systems.

2. Description of the Prior Art

Many modern production and warehousing facilities require the storage and retrieval of thousands of inventoried items. To meet modern production and warehousing facilities needs generally requires a storage system where the storage carousel is in continuous motion. For example, U.S. Pat. Nos. 5,282,712 and 5,472,309 and 5,505,586 show a continuous motion storage system designed to deliver goods at rates which exceed the demand of today's production and warehousing facilities. In general, very complicated and expensive insertion and extraction assemblies such as those described in Lichti, et al., U.S. Pat. No. 4,983,091 were thought to be necessary. Special container mounting assemblies and extractor or inserter mechanisms cooperating therewith were proposed, for example, in Lichti, U.S. Pat. No. 4,968,207. A microprocessor coordinated control system coordinating the movement of a vertical lift with the rest of the system, dedicated input and output shuttles, intricate carousel drive mechanisms, and intricate carousel support mechanisms using castering wheels riding on a precisionly placed continuous loop track, or fixed wheels with turntables at the ends of the tracks, were thought to be necessary, for example, in Lichti, U.S. Pat. No. 5,505,586. In addition, the systems discussed above cannot be easily operated in reverse because many of the parts are specially designed to operate in one direction or, if mechanically able to operate in reverse, would require extensive modifications to the microprocessor control system.

However, many production and warehousing facilities desire a high speed continuous motion storage system having less intricate parts that is easy to service and maintain. In addition, many warehousing facilities desire the ability to operate the system in reverse and have the system function properly, without replacing parts or modifying the microprocessor control system, and do not require a vertical lift to run at variable speeds. Thus, there is a need to provide a less complex continuous storage and retrieval system for material goods, which can be run in either direction, and requires fewer parts so as to reduce its initial cost and minimize maintenance costs.

Another difficulty in previous continuous storage systems was the inability to lift containers of various heights and widths, particularly those that are very narrow. For example, U.S. Pat. No. 5,505,586 discloses shelves and forks having intermeshed scalloped edges wherein the innermost lobe width of the shelf or fork establishes the minimum width of the container which can be transferred and delivered on the storage system. In addition, the maximum container width a storage system can handle is generally determined by the lateral distance between the shelves. Taking the maximum width, subtracting the minimum width, then dividing by the maximum width provides the percentage container width variance which a particular storage system can adequately handle. For example, the storage system as shown in U.S. Pat. No. 5,505,586 can only handle approximately a 25 percent container width variance. Thus, there is a need to provide a storage system having intermeshing shelves and forks which can lift containers having a greater percent container width variance.

These and other difficulties of the prior art have been overcome according to the present invention.

BRIEF SUMMARY OF THE INVENTION

A preferred embodiment of the storage system according to the present invention comprises a simplified rotary storage carousel system which includes a rotary storage carousel, a vertical lift, and a shuttle unit. The shuttle unit includes, for example, a frame mounted for generally reciprocal movement along a shuttle path between the vertical lift and the rotary storage carousel. The shuttle includes at least two banks of individually actuatable or engageable shuttle fork members for transferring containers between the vertical lift and the rotary storage carousel. The individual shuttle fork members in one bank of such members are selectively actuatable to lift objects at the carousel end of the shuttle path and deposit them at the vertical lift end of the shuttle path. The individual shuttle fork members in the other bank are selectively actuatable to lift objects at the vertical lift end of the shuttle path and deposit them at the carousel end of the shuttle path. The input of objects to the rotary storage carousel is accomplished by those shuttle fork members that are actuated to lift objects from the vertical lift and deposit them on the rotary storage carousel. The output of objects from the rotary storage carousel is accomplished by the shuttle fork members which are selectively actuated to pick objects off of the rotary storage carousel and deposit them on the vertical lift. Although the shuttle fork members in each bank are actuated individually and selectively during any given cycle, all of the shuttle fork members in one bank operate at the same point in the shuttle cycle, that is, all of the members in one bank are actuated or engaged at the same end of the shuttle path. Reversing the shuttle cycle reverses the ends of the shuttle cycle at which the respective banks of fork members are actuated.

According to the present invention the timing of the actuation or engagement of the shuttle fork members in a given bank may be changed, without any modification to the components of the system, so that the point during the shuttle cycle at which the actuation occurs is reversed. The reversal of the shuttle cycle is accomplished without mechanical reconfiguration of the system, that is the mechanical parts of the system do not have to be disassembled and reassembled into a different configuration. It is not necessary, for example, to take a fork member actuating cam out of the system and replace it with a cam having a different profile. The mechanism which permits the reversal is built into the system. The elements of the shuttle operating system which determine the shuttle cycle are thus symmetrical. The reversal of the cycle of the shuttle unit's operation is thus made possible by the symmetry of the shuttle units operating elements. The system is, in that sense, symmetrical. The banks are thus able to switch roles so that the input bank becomes the output bank and vice versa. In general, it is preferable, although not usually necessary, to bring the system to a halt in order to accomplish the switch. The system can then be restarted with the roles of the banks reversed. This adds very significantly to the utility of the system. It, for example, permits loading and extracting from either the top or the bottom, or even the middle, of the vertical lift, loading and extracting from either end of the rotary storage carousel, and reversing the direction of travel of the rotary carousel.

Preferably, a mechanical drive system interlocks and mechanically synchronizes the movement of the shuttle, fork members and rotary carousel. If desired, the vertical lift may also be interlocked and mechanically synchronized by the same mechanical drive system. Preferably, a conventional microprocessor coordinated control system is provided for selecting which containers are to be transferred between the carousel and the vertical lift by the shuttle due to the actuation or engagement of the respective fork members.

One preferred way of reversing the operating cycle of the shuttle is to provide two shuttle fork member actuating mechanisms associated with each bank of fork members, one configured to selectively actuate or engage shuttle fork members at one end of the shuttle path, and the other configured to actuate the same shuttle fork members at the opposite end of the shuttle path.

The rotary storage carousel unit is provided with a multiplicity of shelves mounted for generally horizontal projection outwardly from rigid panels so that there is an array of storage locations on the storage carousel unit. The array of storage locations is generally in the form of regular rows and one or more columns on each rigid panel. The rotary storage carousel is generally multi-tiered with the shelves in rows forming the tiers. The rigid panels are generally hingedly attached at their adjacent edges forming an endless loop. The endless loop is generally in the form of a straight sided race track with the sides closely spaced so as to form a well between the reaches which is approximately the width of one panel.

Each panel includes at least one preferably non-castering wheel that supports the weight of the carousel as it travels on the straight tracks. Generally, there are two spaced apart straight tracks which extend generally parallel to one another. According to the present invention, the tracks are separated by a non-track supporting distance, that is, there is no track support for the panels as they are carried in an arc around the ends of the closed path which they traverse. The panels are supported by the hinged connections when they travel across the non-track supporting distance. In one embodiment the straight tracks are mounted below the panels and the rotary storage carousel is generally positioned along its normally upper edge by means of, for example, rolling contact with a suitable guide rail or beam for maintaining the endless loop shape as the carousel rotates. In another embodiment, the straight tracks are generally suspended near the top of the panels having a confining railing guiding the non-swiveling wheels and maintaining the endless loop shape of the storage carousel at its upper end, while the lower end preferably maintains the endless loop shape by means of, for example, rolling contact with a suitable guide rail or beam. Thus, the rotary carousel unit is simplified and costs are reduced by eliminating the need to have castering wheels to support the panels, and the need to have specially aligned and formed curved tracks or turntables forming a continuous loop with the straight tracks.

In general, it is preferred to use a single-tier conveyor system for delivering or distributing the containers to the storage system, although multiple-tier conveyor systems can be employed, if desired. In a typical installation, two conveyors are provided for each vertical lift, a first conveyor operating to deliver containers to the vertical lift and the second conveyor operating to distribute containers away from the vertical lift. By switching the shuttle cycle as described herein, the storage system can be made to operate in the opposite direction so that the conveyers switch functions with the first conveyor operating to distribute containers away from the vertical lift and the second conveyor operating to deliver containers to the vertical lift. Also, by switching the shuttle cycle, objects can be removed and inserted at the top or the bottom of the vertical lift. Conventional microprocessor controls are conveniently utilized to actuate the various shuttle fork members at opposite ends of the shuttle path so as to implement the reversal of the system.

The vertical lift functions to move containers between the delivery or distribution conveyors and the shuttle. The vertical lift has a first side cooperating, for example, with a first conveyor system and a second side cooperating with a second conveyor system. When the vertical lift is operated in one direction the first side accepts containers from the first conveyor system and the second side distributes containers to the second conveyor system. When, for example, the vertical lift is operated in the opposite direction the first side distributes containers to the first conveyor system and the second side accepts containers from the second conveyor system. When the cycle of the shuttle unit is reversed, according to the present invention, the operation of the system remains the same.

The vertical lift generally comprises a plurality of shelves mounted for movement along a vertically positioned endless loop. The shelves are separated so as to provide clearance to accept containers from the conveyor system or deliver containers to the conveyor system. The drive of the vertical lift is preferably intermittent in the sense that it slows down in its vertical travel at the points in the shuttle cycle where containers or goods are transferred to or from it. The vertical lift preferably accelerates to and travels at a higher speed while the shuttle unit is at other locations in its cycle. In one embodiment the vertical lift is interlocked and mechanically synchronized with the movement of the shuttle and storage carousel in order to simplify the overall storage system. Intermittent motion is conveniently imparted to the vertical lift by means, for example, of a Geneva drive system. In this embodiment, during each shuttle cycle, the vertical lift moves through a distance which is predetermined by the gear ratios in the drive system. In another embodiment, the vertical lift can be independently driven but only at incrementally even multiple rates of speed with respect to the speed at which the storage carousel is driven. That is, the shelves must be in position to effect transfers at the proper point in the shuttle cycle, but the vertical lift may move a distance equal to two shelves in one shuttle cycle, and a distance equal to only one shelf in the next shuttle cycle. The speed may thus be varied from one shuttle cycle to the next. The vertical lift may even be halted, if desired, during a particular shuttle cycle.

The shuttle unit includes a frame having a plurality of shuttle fork members that cooperate with the vertical lift shelves and the storage carousel shelves. There is generally a vertically aligned set or bank of shuttle fork members on each side of the shuttle unit, with each set or bank corresponding to the first and second sides of the vertical lift when the shuttle is near the vertical lift, and also corresponding to the rows of shelves on either side of the rotary storage carousel when the shuttle is near the storage carousel. The movement of the shuttle unit is preferably interlocked and mechanically synchronized with the storage carousel by a shuttle yoke cam driven by the drive system which is common to both the shuttle unit and the rotary storage carousel. The shuttle unit preferably includes a shuttle frame which is mounted for generally horizontal, reciprocal motion between the storage carousel and the vertical lift.

The shuttle fork actuation mechanism includes, for example, a cam, associated cam plate, structure for carrying the fork members and elements for engaging the fork members. The shuttle fork actuation mechanism is, for example, driven by the common drive system. The shuttle fork actuation mechanism imparts generally vertical reciprocal motion to those particular shuttle fork members which are selected by the control system for actuation during a particular shuttle cycle. The cam plate which is included in the shuttle fork actuation mechanism is profiled so as to cause the engagement or actuation of the selected shuttle fork members when the shuttle frame is located at one of a first or second predetermined distance from the rotary storage carousel. In general, the first and second positions are near the opposite ends of the path which is traversed by the shuttle frame as it travels between the rotary storage carousel and the vertical lift. At the first predetermined distance the bank of shuttle forks in which the actuated fork member occurs are adjacent to the rotary storage carousel, and at the second predetermined distance, the bank of shuttle forks is adjacent to the vertical lift. When a shuttle fork member is actuated by a shuttle fork actuation mechanism it then cooperates with the rotary carousel shelves and the vertical lift shelves to lift a container from one and deliver it to the other.

The mating edges of the shelves and the forks are so configured that they intermesh without interference. The shuttle fork members generally pass beneath the vertical and rotary carousel shelves on each shuttle cycle unless they are actuated. When actuated a shuttle fork member moves vertically to a position above, for example, the corresponding vertical lift shelf, so as to lift the object on the shelf off of the vertical lift shelf. The timing of the vertical movement is such that the shelf and fork intermesh with each other without interference. In one convenient configuration a detente element carried by a solenoid engages a respective shuttle fork member to a fork engaging member to lift a container from either a vertical lift or storage carousel shelf. The movement of the shuttle frame responsive to the urging of the shuttle yoke cam moves the actuated shuttle fork member bearing the object to the other of the vertical lift or storage carousel shelves. When the shuttle fork member is in position to deposit the object on the shelf the fork engaging member releases the actuated shuttle fork member and allows it to intermesh with and move to a position below the adjacent shelf. This causes the object to be deposited on the adjacent shelf.

In a preferred embodiment, the vertical reciprocal motion is established by the forklift cam and shuttle yoke cam following the same circular motion path when driven by the common drive system. The shuttle yoke cam engages a straight slot in the shuttle frame thereby imparting generally horizontal reciprocal motion in the shuttle. The forklift cam engages a continuous offset slot in an elongated inverted cam plate riding on the shuttle frame. The elongated inverted cam plate is restricted to move the length of the offset slot relative to the shuttle frame, without rotation. The offset slot is positioned so as to establish reciprocal motion of the inverted cam plate with respect to the shuttle frame when the shuttle frame travels along a shuttle path.

The shuttle path has a first end which is generally adjacent the rotary storage carousel, and a second end which is generally adjacent the vertical lift. Near the first end of the shuttle path, at a predetermined distance from the rotary storage carousel, and near the second end of the shuttle path, at a second predetermined distance from the rotary storage carousel, the interaction between the inverted cam plate and the forklift cam causes the inverted cam plate to move relative to the shuttle frame. This configuration creates intermittent, straight, reciprocal motion of the inverted cam plate with respect to the shuttle as the shuttle passes through the ends of its reciprocal motion. This intermittent, straight, reciprocal motion is transmitted to the forks through a mechanical linkage.

The remote ends of the inverted cam plate are attached, for example, to separate chains which are trained around sprockets. One end of each chain is connected to a fork engaging member that moves in an intermittent reciprocal motion, relative to the shuttle frame, responsive to the motion of the inverted cam plate. Each fork engaging member is associated, for example, with one of at least two banks of shuttle fork members. The second end of each chain is connected to a second fork engaging member which is similarly mounted and is also associated with the same bank of shuttle fork members. Thus, there are two fork engaging members for each bank of shuttle fork members. One fork engaging member in a particular bank is actuated to lift fork members at one end of the shuttle path and the other in that bank is actuated to lift fork members at the other end of the shuttle path. While the system is operating in one direction, only one of the fork engaging members is operating to lift fork members. The other idles through the complete cycle. When the direction of the system is reversed the previously active fork engaging member becomes the idler. Each of the two fork engaging members includes, for example, an engaging slot for each shuttle fork member in the bank. Thus there are two engaging slots available for each shuttle fork member. Each fork engaging member moves upwardly during each cycle, one at one end of the shuttle path and the other at the other end of that path. Each fork engaging member is elevated during one half of the shuttle cycle, depending upon which end of the path it was actuated at.

For each shuttle fork member there is a detente or toggle bar that, when activated, engages one, but not both, of the two available engaging slots in the respective fork engaging members. The toggle bar, when engaged in an engaging slot on one of said fork engaging members, causes the shuttle fork member to move with the fork engaging member. Generally such movement is upward against gravity. The shuttle fork member is thus activated or engaged. In one preferred embodiment, the toggle or detente associated with a specific shuttle fork member is activated by a solenoid energized by a conventional microprocessor control system. Regardless of the direction the storage system is driven, the toggle bar or detente will engage one of the two available engaging slots on the two fork engaging members. Thus, each fork may be activated individually and independently from the other forks. The fork members will be actuated at one end or the other of the shuttle path depending upon which fork engaging member the toggle bar engages.

Each shuttle fork member cooperates and intermeshes with the corresponding vertical lift and storage carousel shelves. In a preferred embodiment, each shelf for the vertical lift and storage carousel comprises a narrow central extension protruding outwardly and having a plurality of spaced apart shelf fingers extending generally perpendicular to the narrow central extension. Correspondingly, each fork of the shuttle has two outwardly extending arms spaced apart by a distance sufficient to clear the outer ends of the shelf fingers. Each outwardly extending arm carries a plurality of matching fork fingers extending generally perpendicular to the outwardly extending arm and spaced to intermesh with and clear the shelf fingers. The clearance distances between the mating shelves and shuttle fork members determines the minimum container size which the storage system can handle. The maximum size is generally determined by the vertical and horizontal distances between the shelves on the rotary storage carousel. In one embodiment proper sizing of the shelves and forks provides a percentage container width variance of at least 70 percent.

To simplify the storage system a common drive system interlocks and mechanically synchronizes the rotation motion of the storage carousel, the horizontal reciprocal motion of the shuttle frame, and the intermittent vertical reciprocal motion of the forks. Eliminating separate drive systems eliminates the maintenance of multiple drive systems and the need to provide and maintain control systems for the synchronization of these units. The interlocking mechanical synchronization achieves the same function no matter in what direction the drive system is operated. In another preferred embodiment the drive system also interlocks and mechanically synchronizes the rotation of the vertical lift. A single motor or other power source is thus capable of driving the entire storage carousel system.

In particular, one preferred embodiment of the drive system driving the storage carousel comprises a plurality of straight pinion gears aligned and attached on a continuous loop of the rotating storage carousel that are driven by a rotating gear driven by a rotary power source, for example, an electrical motor. Similarly, in another embodiment, the vertical lift can be driven by a plurality of straight pinion gears aligned and attached on a continuous loop by a rotating gear driven by a rotary power source.

Other objects, advantages, and novel features of the present invention will become apparent from the following detailed description of the invention when considered in conjunction with the accompanying drawings.

BRIEF DESCRIPTION OF THE DRAWINGS

The present invention provides its benefits across a broad spectrum of storage systems for the automated storage and retrieval of material goods. While the description which follows hereinafter is meant to be representative of a number of such applications, it is not exhaustive. As those skilled in the art will recognize, the basic methods and apparatus taught herein can be readily adapted to many uses. It is applicant's intent that this specification and the claims appended hereto be accorded a breadth in keeping with the scope and spirit of the invention being disclosed despite what might appear to be limiting language imposed by the requirements of referring to the specific examples disclosed.

Referring particularly to the drawings for the purposes of illustration only and not limitation:

FIG. 3 is fragmentary diagrammatic elevational view similar to FIG. 2 showing the shuttle at an intermediate location between the rotary storage carousel and the vertical lift.

FIG. 4 is a fragmentary diagrammatic plan view similar to FIG. 1 showing the path which the rotary storage carousel shelves follow in one full cycle of the shuttle.

FIG. 5 is a fragmentary diagrammatic elevational view similar to FIG. 3 showing the path which the shuttle forks follow on one side of the shuttle to move a container from the rotary storage carousel to the vertical lift.

FIG. 6 is a fragmentary diagrammatic elevational view similar to FIG. 5 showing the path which forks follow on one side of the shuttle to move a container from the vertical lift to the rotary storage carousel.

FIG. 7 is a fragmentary diagrammatic isometric view of the rotary storage carousel supported on two separate straight tracks with the shelves truncated for clarity.

FIG. 16 is a fragmentary diagrammatic elevational view, similar to FIG. 14, illustrating an embodiment of the selective lift means for the shuttle shelves.

FIG. 16A is fragmentary elevational view more particularly showing a portion of the fork actuation mechanism.

FIG. 17 is a side view of a fork engaging member which is a part of a fork actuation mechanism.

FIG. 20 is top view taken along line 20—20 in FIG. 21 of a portion of an embodiment of the fork actuation mechanism or selective lift means including a toggle bar and solenoid engaged with a fork engaging member.

FIG. 21 is an elevational view of the embodiment of FIG. 20.

DETAILED DESCRIPTION OF THE PREFERRED EMBODIMENTS

Figure 1:
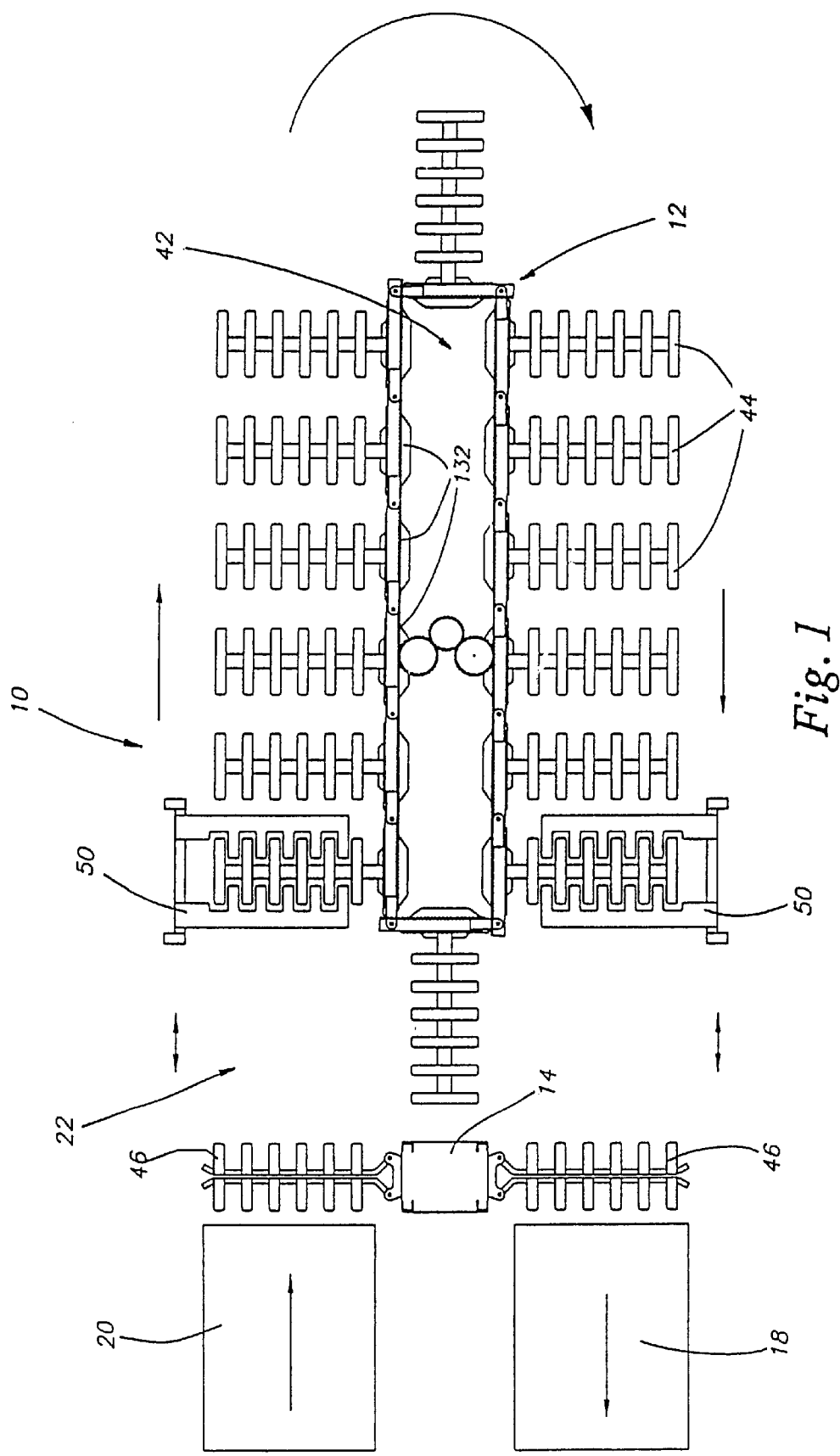
FIG. 1 is a diagrammatic plan view of a preferred embodiment of the invention.

Referring now to the drawings wherein like reference numerals designate identical or corresponding parts throughout the several views.

In the preferred embodiment which has been selected for purposes of illustration, there is illustrated generally at 10 a storage system. Storage system comprises a rotary storage carousel indicated generally at 12, a vertical lift 14, and a shuttle 16. For purposes of illustration, FIG. 1 shows storage system 10 operating in one direction although the storage system 10 can function identically when operated in the opposite direction. As shown in FIG. 1 a first conveyer 18 removes items which have been stored in and retrieved from storage system 10, and a second conveyer 20 delivers items for storage in storage system 10. When storage system 10 is operated in the opposite direction from that shown in FIG. 1, the functions of the conveyors can be switched so that, for example, second conveyer 20 removes items which have been retrieved from storage system 10, and first conveyer 18 delivers items to be stored in storage system 10. Vertical lift 14 operates to transport storage items generally vertically between the level of the conveyor units and the levels where the items are to be stored on the rotary storage carousel. Shuttle 16 operates within transfer zone 22 to carry storage items at constant levels between the vertical lift 14 and the rotary storage carousel 12, without the use of any holding area. Preferably, the conveyor units interact with the vertical lift at a level which is below or above or at least different from that at which the shuttle interacts with the vertical lift. For purposes of illustration a system will be described which has a transfer zone at only one end of the carousel unit. It will be understood by those skilled in the art that a second transfer zone could be provided at the second end of the carousel unit. For ease of understanding, the rotary carousel, vertical lift, and shuttle will be described somewhat generally with reference to very diagrammatic drawings and then the details of the various units will be addressed with reference to more detailed drawings. In order to avoid obscuring the invention with too much detail, throughout the drawings conventional details such as supporting brackets, chain tighteners, and the like, have been omitted unless necessary to an understanding of the invention.

Figure 8:
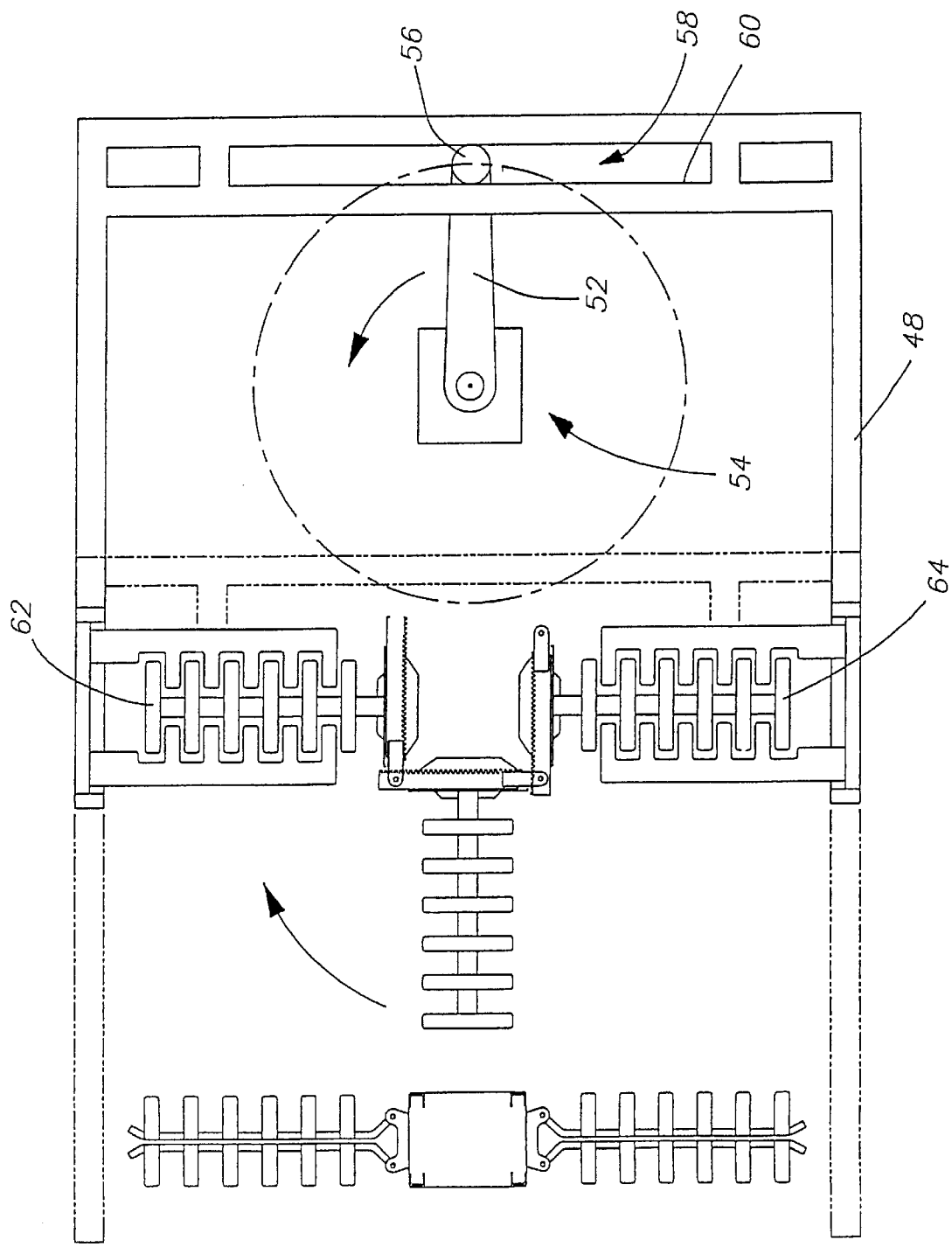
FIG. 8 is a fragmentary diagrammatic plan view illustrating partly in Phantom one position during the shuttle cycle wherein the shuttle frame is at the end of the shuttle path adjacent to the rotary storage carousel.
Figure 9:
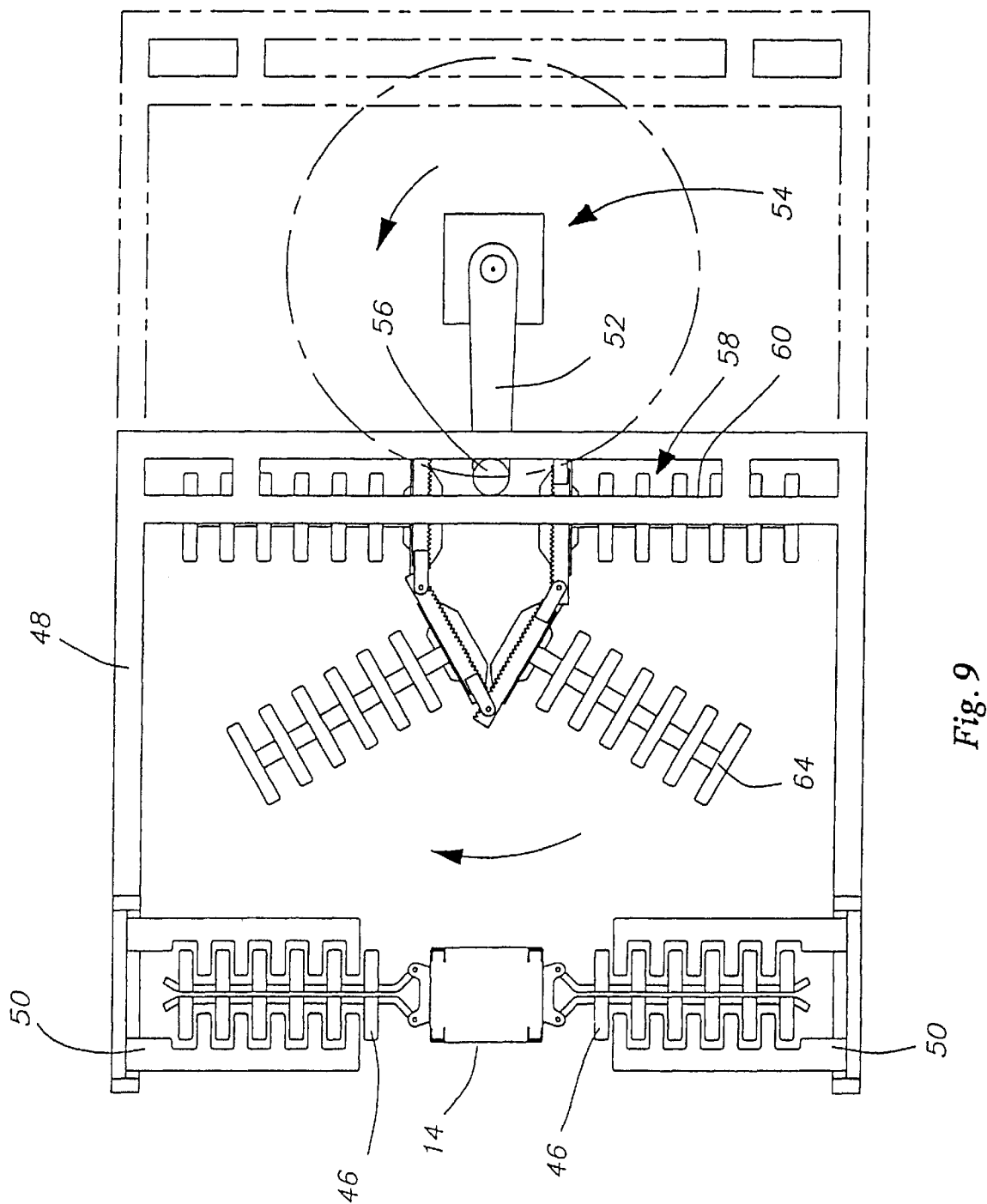
FIG. 9 is a fragmentary diagrammatic plan view illustrating partly in phantom a second position during the shuttle cycle wherein the shuttle frame is at the end of the shuttle path adjacent to the vertical lift.

In FIGS. 1 through 6, the system is shown in very diagrammatic form so as to facilitate an understanding of the invention, particularly as to the various units and their cooperation with one another, as well as their operation. In FIGS. 8 and 9 the structural detail has been simplified, again, to facilitate an understanding of the invention. FIGS. 10 through 15, which show the interlocking and mechanically synchronized drive mechanism between the rotary storage carousel and the shuttle forks, have likewise been simplified for purposes of clarity.

Figure 2:
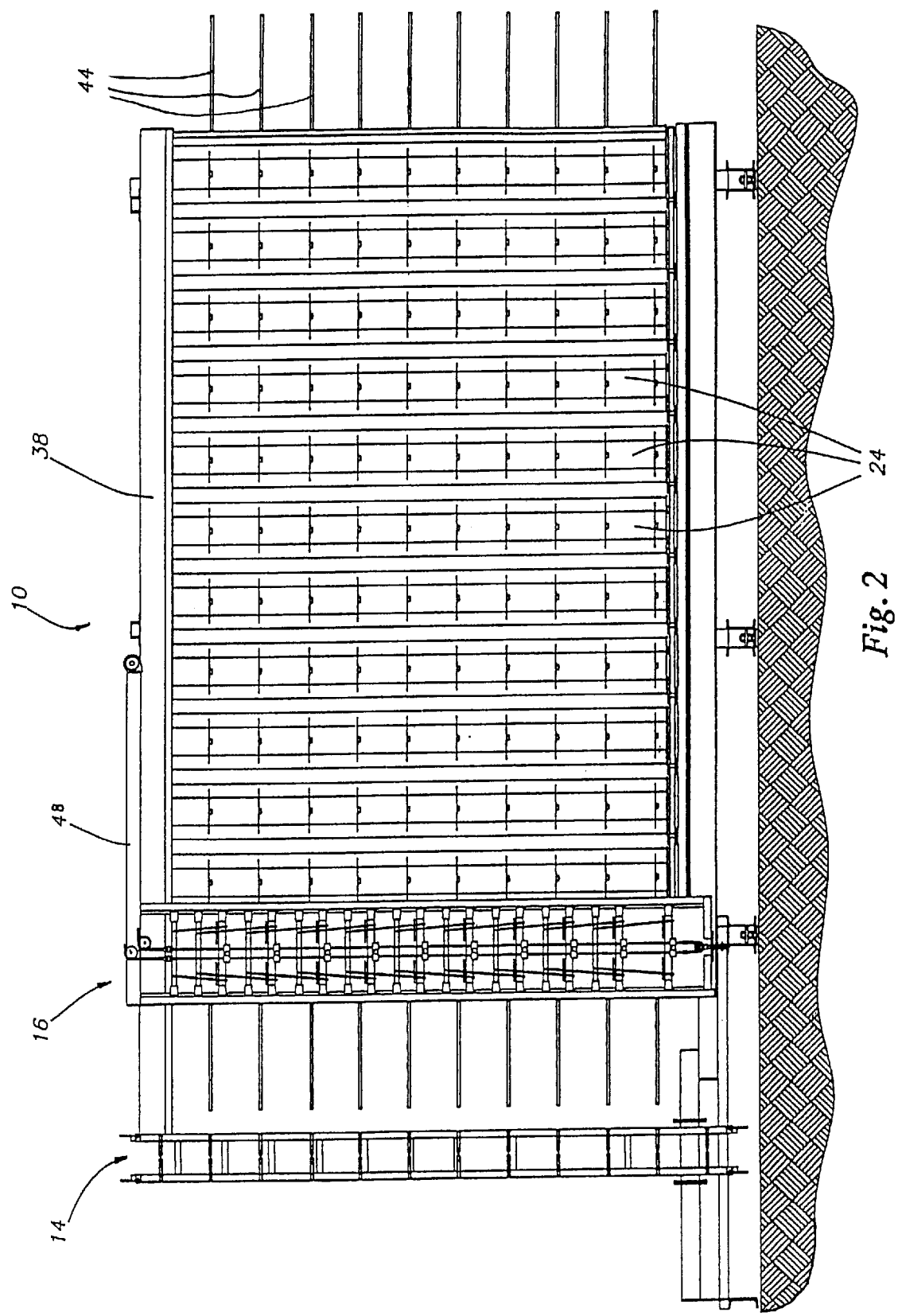
FIG. 2 is a diagrammatic elevational view of the preferred embodiment of FIG. 1.

Rotary storage carousel 12 is in the form of a series of racks or rigid panels 24 (See FIG. 7, for example) hingedly joined edge-to-edge in the form of an endless loop or generally closed path similar to a continuous link belt. Each rack or rigid panel 24 is supported at one end by a non-castering wheel 26 as each rigid panel 24 travels on straight tracks 28. As used herein "non-castering" means that the wheel is mounted so that it has no ability to rotate around the axis upon which it is mounted to rigid panel 24. The wheels are, of course, journaled for rotation about the central axes which is generally normal to the plane of the circular wheel. Generally, there are two straight tracks 28 parallel to one another and separated by a non-track supporting distance indicated generally at 30 in, for example, FIG. 7. It is to be appreciated that additional straight tracks could be provided placed in a non-parallel configuration, such as a triangle, or parallel configuration, such as a square, in keeping within the scope of the present invention. As racks or rigid panels 24 travel across non-track supporting distance 30, they are supported by hinged connections 32 thereby simplifying the rotary storage carousel by eliminating the need for curved tracks and castering wheels. The upper edge of rotary storage carousel 12 is guided by an overhead beam 38, as shown in FIG. 2, preferably by the engagement of rollers or wheels on the beam rolling on the normally uppermost edges of rotary storage carousel 12, thus maintaining its endless loop shape. Straight tracks 28 are mounted on a solid carefully leveled foundation so that the fully loaded rotary storage carousel 12 is adequately leveled for smooth movement. Likewise, overhead beam 38 is carefully positioned and leveled so as to position the upper edge of rotary storage carousel 12. In one convenient embodiment, overhead beam 38 is supported on conventional pedestals or vertical beams, not shown, which, for example, extend upwardly within well 42 which is defined between the approaching and departing reaches of rotary storage carousel 12. It is to be appreciated that straight tracks 28 and overhead beam 38 could be respectively switched, supporting and suspending rotary storage carousel 12 in the air, while keeping within the spirit of the invention.

In general, the reaches of the endless loop are parallel to one another for at least a substantial part of the endless loop or generally closed path along which rotary storage carousel 12 travels. One end of the generally elongated rotary storage carousel is positioned at a transfer zone located generally at 22. Storage containers or other objects are positioned on storage locations on the racks or rigid panels 24 by means of an array, for example, of carousel shelves 44 forming rows and columns. other support means may be used if desired. The spacing between carousel shelves 44 is selected dependent upon the height and width of the containers or objects which are intended to be stored thereon. Clearance between containers on the shelves should be at least approximately 3 inches. There may be as many at 30 rows of carousel shelves, more or less, in rotary storage carousel 12. The top surfaces of carousel shelves 44 should be generally flat since the containers simply rest on the shelves. The system permits great flexibility in the design of the shelves-container combination. Special support shelves and containers may be used if desired, although they are not preferred because of the added complexity and expense. The system is very flexible as to scale. There may be as few as 10, or less, and as many as 2,000 or more, storage locations in a relatively small space, all easily and quickly accessible. Where all of the storage shelves are to be loaded or cleared at one time it generally requires less than 2 full revolutions of the rotary carousel to accomplish such loading or unloading.

Containers or other objects are delivered to and transferred from storage system 10 by means of conveyors 20 and 18, respectively, depending on which direction the system is operated. First conveyor 18 and second conveyor 20 operate adjacent vertical lift 14. Once a container has been identified for transfer into or out of the system it moves through the transfer zone 22, preferably without the need for any holding station, although holding may be provided, if desired, by the inclusion of a simple set of stationary shelves intermediate the vertical lift 14 and the rotary storage carousel 12.

Vertical lift 14 moves containers intermittently in a generally vertical direction between first conveyor 18 or second conveyor 20 and the level of the desired row of shelves on rotary storage carousel 12. Second conveyor 20, for example, delivers containers to vertical lift 14 on the vertical lift's ascending reach and first conveyor 18, for example, accepts containers from vertical lift 14 on the vertical lift's descending reach when the storage system is operated in one direction. When the storage system is operated in the opposite direction, the descending and ascending sides of vertical lift 14, may, for example, be switched. Reversing the shuttle cycle also permits one or both of the conveyors to be positioned so that it cooperates with vertical lift 14 in transferring objects at the top rather than the bottom of the vertical lift. This permits flexibility in the positioning of the conveyors so as to, for example, elevate them out of the way of activities on the floor in the vicinity of the storage system 10. Vertical lift 14 includes vertical lift shelves 46 vertically spaced apart and generally similar to the rotary storage carousel shelves 44. Vertical lift shelves 46 rotate in an endless, vertically disposed loop.

Shuttle 16 consists of a shuttle frame 48 generally residing in transfer zone 22 and operating between the rotary storage carousel and the vertical lift. A shuttle cycle begins, for example, with the shuttle fork members 50 in a first bank of forks at a first end of the path traveled by the shuttle frame in position to lift containers from storage carousel shelves 44. Half way through the cycle the shuttle fork members 50 are at the second end of the path traveled by the shuttle frame in position to deposit the containers on the vertical lift shelves 46. The shuttle cycle ends with the shuttle frame back at the first end of the shuttle path. Reversing the shuttle cycle enables the first bank of forks to pick containers up at the second end of the path and deposit them at the first end. On each side of shuttle 16 are banks of shuttle fork members 50 which are aligned vertically and generally spaced identical to the spacing of the rows of storage carousel shelves 44. The banks are actuated at opposite ends of the shuttle cycle. Forks 50 intermesh with storage carousel shelves 44 and vertical lift shelves 46. A selective lift means, such as, for example, a fork actuation mechanism, is necessary to enable a shuttle fork member to selectively lift a preselected container from either rotary storage carousel shelves 44 or vertical lift shelves 46. Thus, a fork actuation mechanism must, at a predetermined position, move the selected shuttle fork members vertically upward at either the rotary storage carousel 12 or vertical lift 14 to lift a container from a shelf. The shuttle fork member preferably remains at a constant height as shuttle frame 48 moves between the shelves, and, at a predetermined position, vertically lowers shuttle fork member 50 so as to place the container on a respective shelf. The mechanical lift mechanism must be selective in that during a given shuttle cycle only individually predetermined forks are vertically raised and lowered to transfer a preselected container. Thus, forks not predetermined to be actuated to transfer a container during a given shuttle cycle move through zone 22 along a generally reciprocal horizontal path which does not interference with the shelves and does not have a vertical component.

The mechanical lift means, for example, a fork actuation mechanism, functions so as to provide vertical motion to selected shuttle forks 50 generally as shown in FIGS. 5 and 6. Each shuttle fork in each bank is individually mounted so that it is capable of vertical motion independent of the other shelves in the bank in which it occurs. Thus, one, or all, or less than all of the shuttle fork members 50 in a given bank may be actuated during any given shuttle cycle. FIG. 5 shows the motion or path of shuttle forks 50 on one side of shuttle 16 that would lift a container from a rotary carousel shelf 44 and place it on vertical lift shelf 46. The shuttle forks 50 on the opposite side of shuttle 16 would move to lift a container from vertical lift shelf 46 and place it on a rotary storage carousel shelf 44 as shown, for example, by the path indicated in FIG. 6. Because of its diagrammatic nature, FIG. 6 may also be viewed as illustrating the path those shuttle forks 50 which are illustrated in FIG. 5 would take if the shuttle cycle were reversed.

Referring, for example, to FIGS. 8 and 9, shuttle frame 48 is driven in a reciprocal straight path between rotary storage carousel 12 and vertical lift 14. Generally, shuttle frame 48 preferably rides on grooved wheels on a track so that the path it follows is well defined. Drive arm 52 is mounted to and driven by drive system 54. Mounted on one end of drive arm 52 is yoke cam follower 56 that moves in a circular path. Yoke cam follower 56 engages shuttle yoke cam 60 consisting of an elongated slot 58 in shuttle frame 48. As drive system 54 drives and rotates yoke cam follower 56, shuttle frame 48 moves in generally straight line reciprocal motion along a shuttle path. When the shuttle frame 48 is at the end of the shuttle path which is adjacent rotary storage carousel 12, two opposed columns of shelves, 62 and 64, on the rotary carousel, are in position to interact with the respective adjacent banks of shuttle fork members 50. Thus, the system is at that moment in position to accept or deliver selected containers to the column of shuttle fork members 50 of shuttle 16. As the shuttle cycle continues, the carousel moves to the position shown for example in FIG. 4. FIGS. 8 and 9 show the two extreme positions of shuttle forks 50 when they are aligned with the opposed columns of shelves, 62 and 64, of rotary storage carousel 12, and the columns of shelves 46 of the vertical lift 14, respectively. As drive arm 52 completes one revolution, drive system 54 preferably drives rotary storage carousel 12 a distance equal to the width of one panel 24, as indicated, for example, in FIG. 4.

Figure 10:
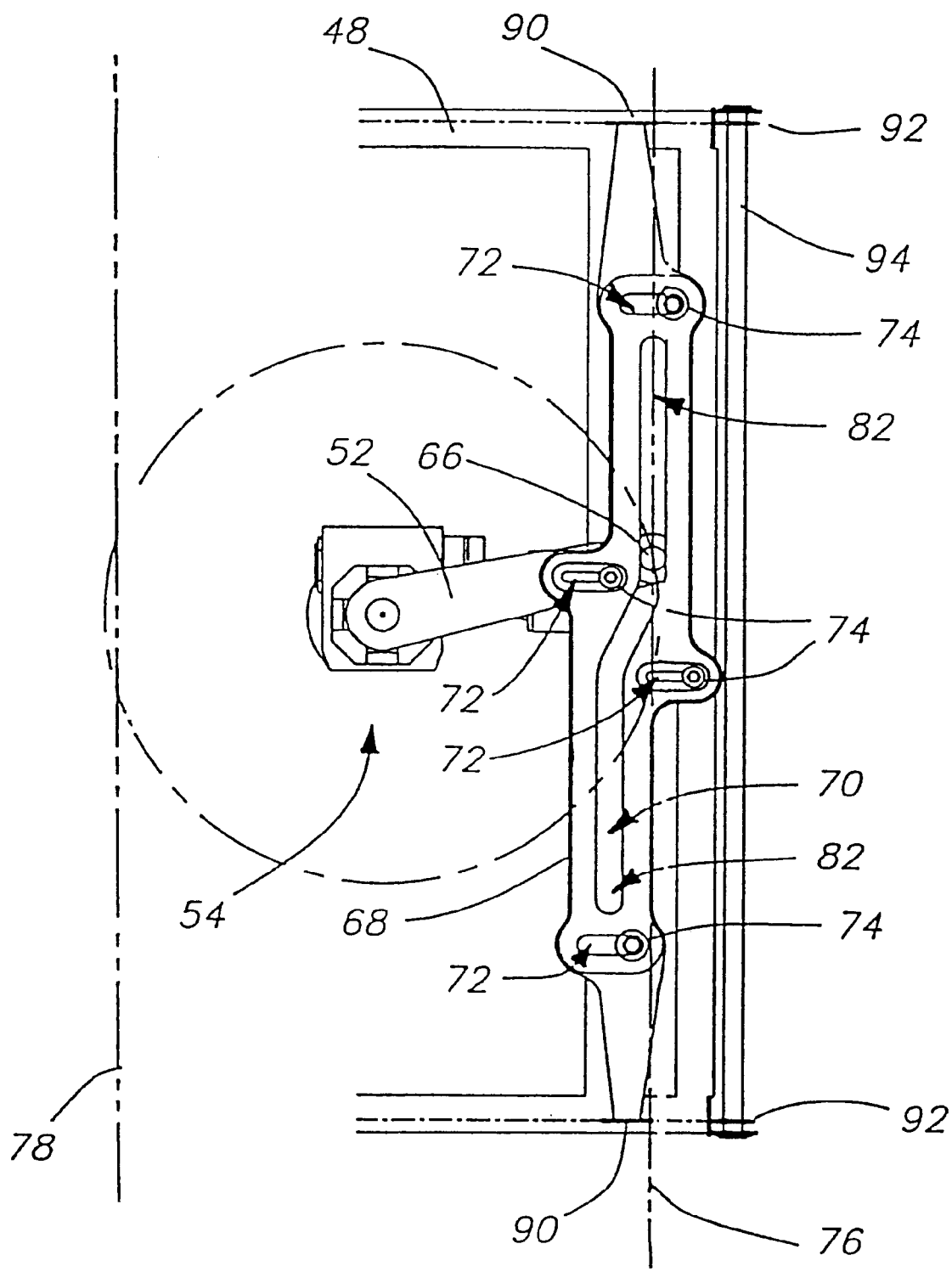
FIG. 10 is a fragmentary diagrammatic plan view of the shuttle, shuttle yoke cam, and elongated inverted cam plate with the shuttle departing a first predetermined position.

FIGS. 10 through 13 diagrammatically show a portion of the preferred embodiment of the selective mechanical lift means or shuttle fork actuation mechanism which establishes intermittent straight line reciprocal motion for actuating the shuttle fork members 50. These Figs. illustrate the addition of a shuttle fork actuation mechanism added to the shuttle system shown, for example, in FIGS. 8 and 9. Coaxially mounted with shuttle yoke cam 56, and attached to drive arm 52, is forklift cam follower 66. Forklift cam follower 66 is drivern in the same circular path as yoke cam follower 56. An elongated inverted cam plate 68 having a continuous offset slot 70 is reciprocally mounted on shuttle frame 48 and engaged by forklift cam follower 66. Elongated inverted cam plate 68 includes straight slot ends 82 which are parallel to and offset from each other. Straight slot ends 82 are connected via a diagonal slot so that forklift cam follower 66 can transition from one slot end to the other as drive arm 52 carries the cam follower through the shuttle cycle. Elongated inverted cam plate 68 is slidably mounted, via mounting slots 72, to shuttle frame 48, thus allowing elongated inverted cam plate 68 to move in straight line motion, without rotation, with respect to shuttle frame 48 as forklift cam follower 66 transitions through the diagonal slot from one straight slot end to the other. Attachment pins or bolts 74 are secured to shuttle frame 48 and extend through mounting slots 72 so as to restrict the motion of elongated inverted cam plate 68 to a straight line. For illustration purposes only, drive arm 52 rotates counterclockwise. Shuttle frame 48 travels through each of a first predetermined position, indicated by line 76, and a second predetermined position, indicated by line 78, twice in each shuttle cycle. While the shuttle frame 48 travels from the first predetermined position to the adjacent end of its path, the forklift cam follower 66 transitions through the diagonal slot from one straight slot end 82 to the other. The same conditions exist at the opposite end of the shuttle path. Thus, at each end of the shuttle path there is a linear movement of the elongated inverted cam plate 68 relative to the shuttle frame 48 by reason of the movement of the forklift cam follower 66 through the diagonal slot from one straight slot 82 to the other. This movement is harnessed to actuate the shuttle fork members. The straight slots 82 and the diagonal slot taken together comprise continuous offset slot 70. Considering FIG. 11, shuttle frame 48 is positioned at the first predetermined position 76 with forklift cam follower 66 engaged in elongated inverted cam plate continuous offset slot 70 at the beginning of the diagonal slot. As drive arm 52 rotates counterclockwise shuttle frame 48 moves outwardly to its full extension and back to first predetermined position 76 as shown in FIG. 10. During the rotation of drive arm 52 from FIG. 11 to FIG. 10 forklift cam follower 66 travels through the diagonal portion of offset slot 70 to the end of the diagonal portion, thus moving elongated inverted cam plate 68 inwardly a distance 80 with respect to shuttle frame 48. As drive arm 52 rotates counterclockwise from first predetermined distance 76 of FIG. 10 to second predetermined distance 78 of FIG. 13, forklift cam follower 66 travels through one straight slot end 82 of continuous offset slot 70 maintaining elongated inverted cam plate 68 in a stationary position with respect to shuttle frame 48. During the rotation of drive arm 52 from FIG. 13 to FIG. 12 forklift cam follower 66 travels through the diagonal slot in offset slot 70, thus moving elongated inverted cam plate 68 outwardly distance 80 with respect to shuttle frame 48. Finally, as drive arm 52 rotates counterclockwise from the position illustrated in FIG. 12 to the position illustrated in FIG. 11, elongated inverted cam plate 68 remains stationary with respect to shuttle frame 48. Thus, continuous rotation of drive arm 52 establishes intermittent straight line reciprocal motion of elongated inverted cam plate 68 with respect to shuttle frame 48. In addition, the straight line reciprocal motion is achieved regardless of whether drive arm 52 is rotated clockwise or counterclockwise.

Figure 11:
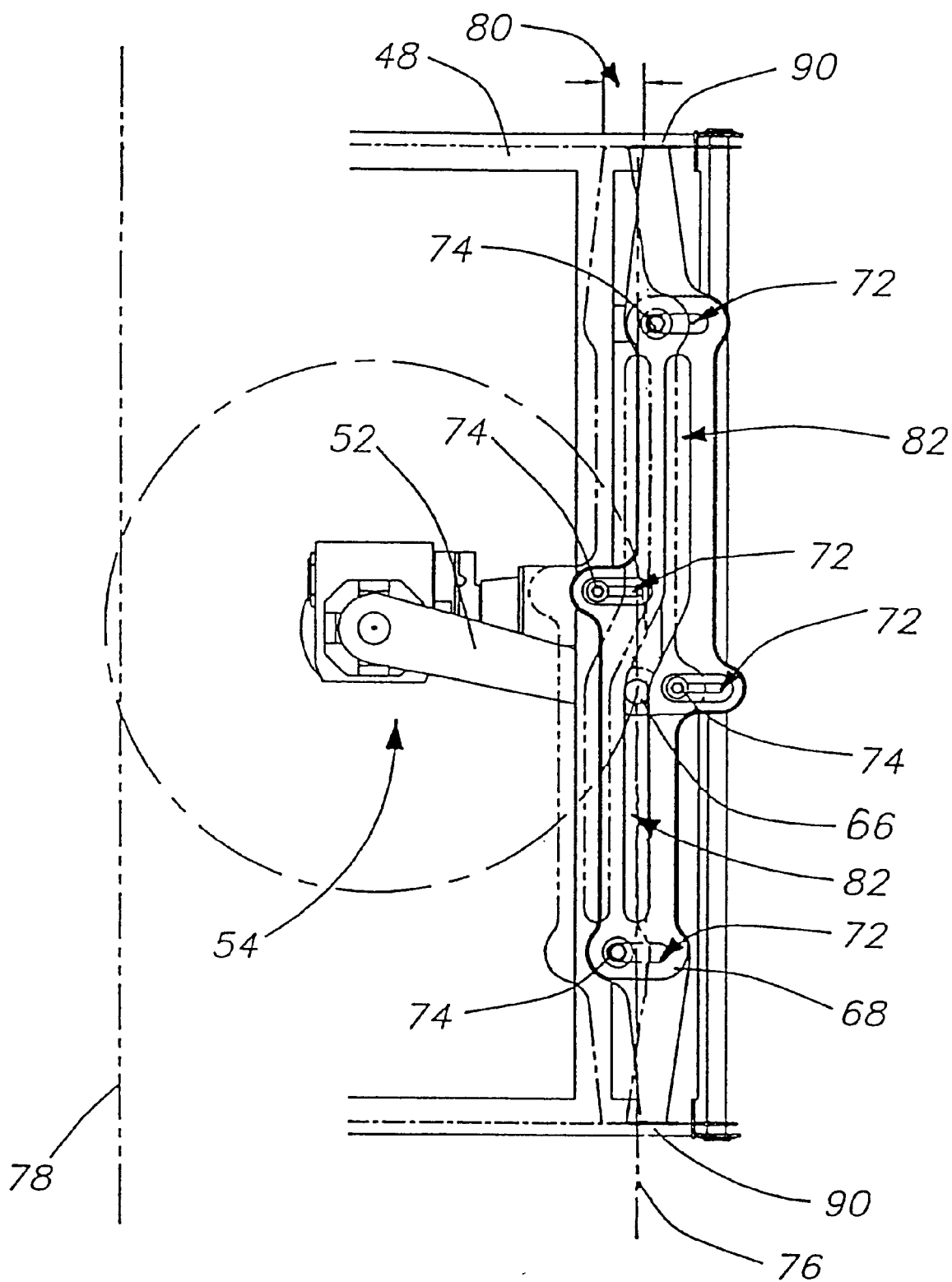
FIG. 11 is a fragmentary diagrammatic plan view of the shuttle, shuttle yoke cam, and elongated inverted cam plate with the shuttle approaching the first predetermined position.
Figure 12:
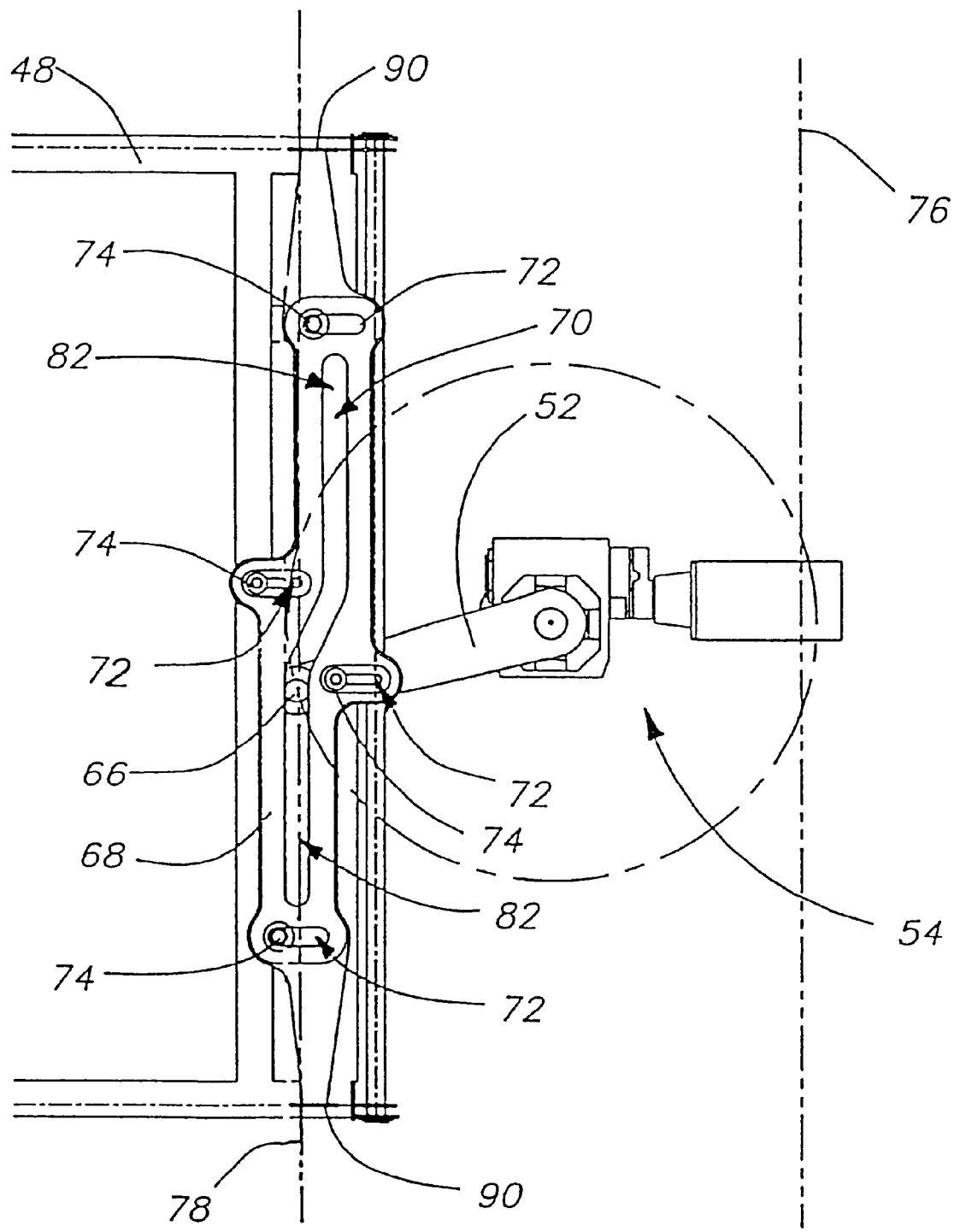
FIG. 12 is a fragmentary diagrammatic plan view of the shuttle, shuttle yoke cam, and elongated inverted cam plate with the shuttle departing the second predetermined position.
Figure 13:
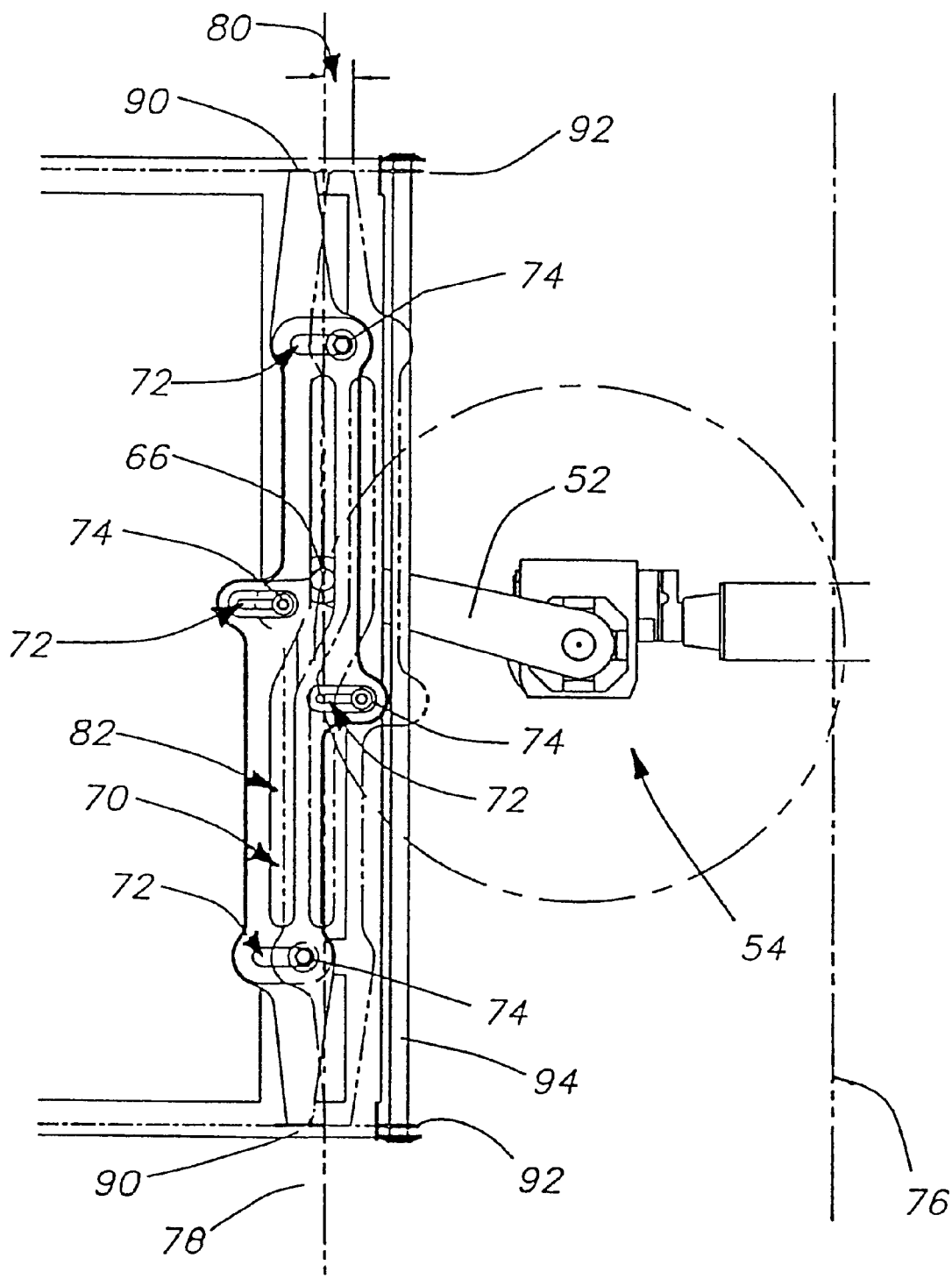
FIG. 13 is a fragmentary diagrammatic plan view of the shuttle, shuttle yoke cam, and elongated inverted cam plate with the shuttle approaching the second predetermined position.
Figure 14:
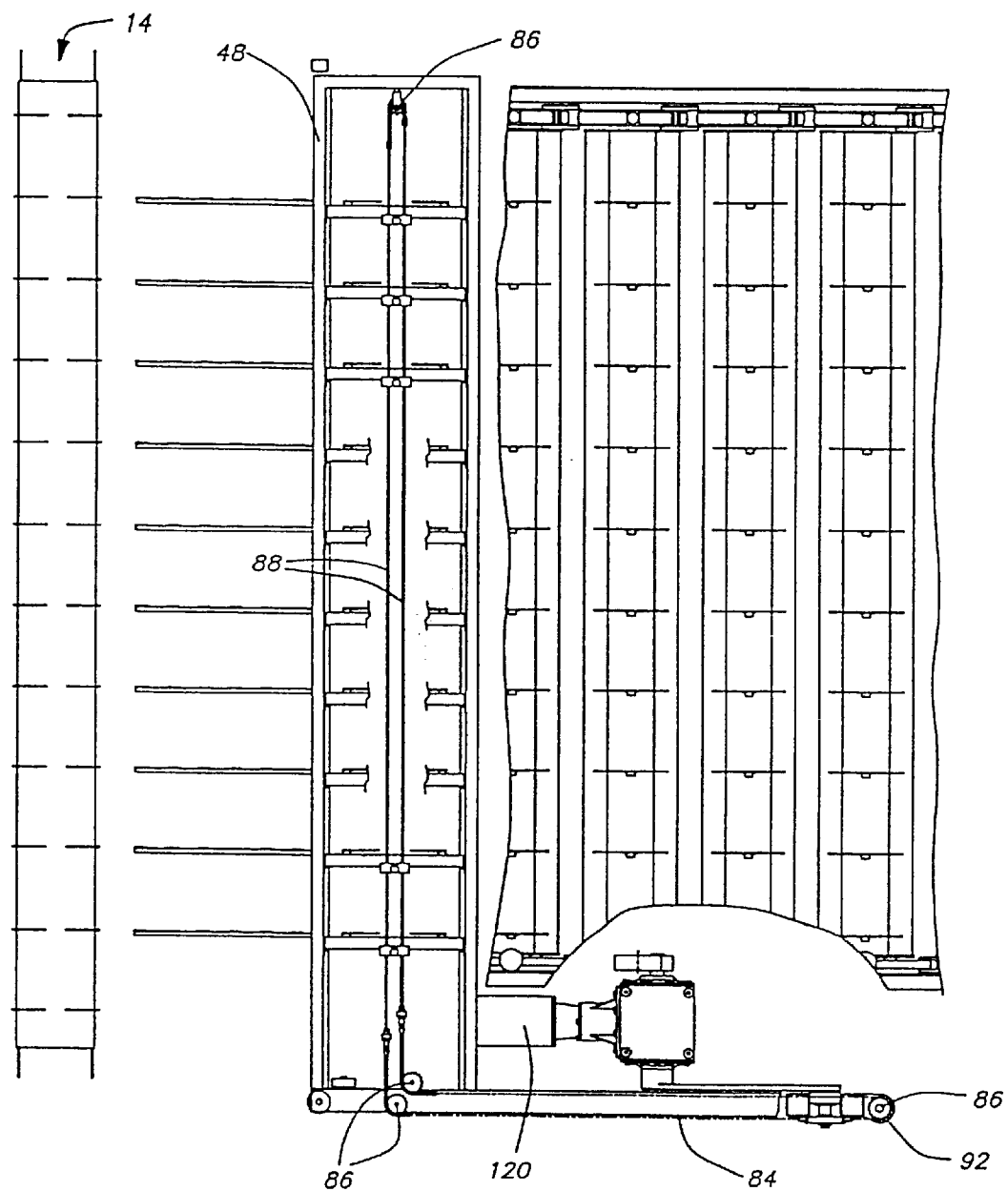
FIG. 14 is a fragmentary diagrammatic elevational view of the shuttle moving through the first predetermined position from FIG. 11 to FIG. 10 showing an embodiment of the shuttle fork actuation mechanism or mechanical lift means in which chain loops are connected between the ends of the elongated inverted cam plate and the members which engage directly with the shuttle fork members.
Figure 15:
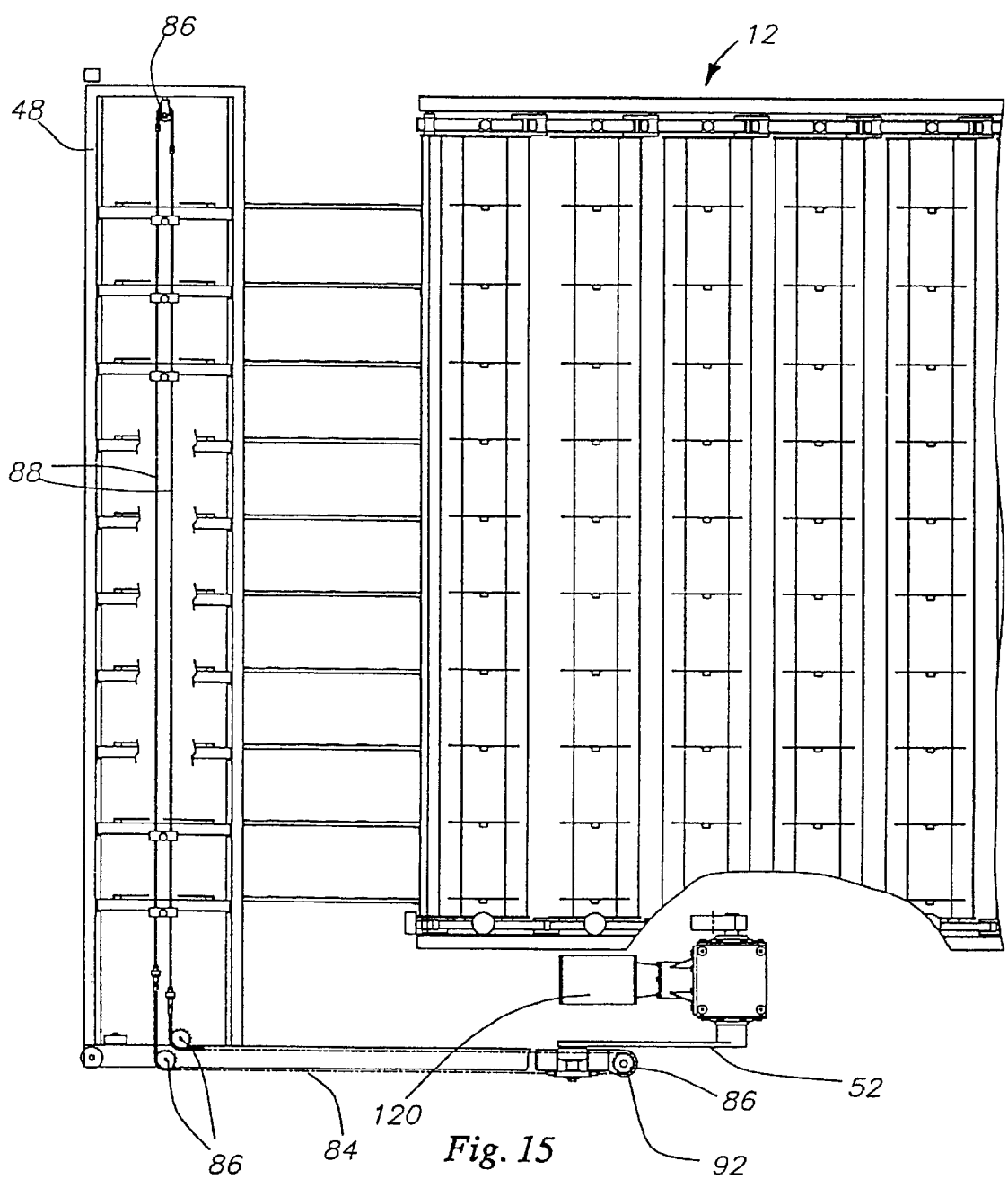
FIG. 15 is a fragmentary diagrammatic elevational view, similar to FIG. 14 with the shuttle at the opposite end of the shuttle path.

FIGS. 14 and 15 diagrammatically show another portion of the preferred embodiment of the selective mechanical lift means whereby the intermittent straight line reciprocal motion of elongated inverted cam plate 68 with respect to shuttle frame 48 is converted into vertical intermittent reciprocal motion for selectively actuating predetermined shuttle fork members to engage and transfer containers between vertical lift 14 and rotary storage carousel 12. On each side of shuttle frame 48 is, for example, a loop of chain 84 supported by wheels or sprockets 86. Preferably, each loop of chain 84 is trained on sprockets 86 which are rotatably attached to and carried by shuttle frame 48. Each end of chain loop 84 is attached to a separate fork engaging member 88. Each of the ends 90 of elongated inverted cam plate 68 are mounted to one reach of the respective chain loops 84. As the ends 90 move through the distances 80, they carry the chain loops 84 with them. Referring, for example, to FIGS. 10, 11 and 14, as drive arm 52 rotates from the position in FIG. 11 to the position in FIG. 10 shuttle frame 48 moves from the first predetermined position outwardly to full extension at one end of its path of travel and inwardly back to the first predetermined position. During this movement of shuttle frame 48, elongated inverted cam plate 68 moves axially with respect to shuttle frame 48. Because the ends 90 are mounted to chain loops 84, the chain loops move axially so that one reach shortens and the other lengthens. This causes one of the fork engaging members 88 on each side of shuttle frame 48 to move upward, and the other to move downward. Referring, for example, to FIGS. 12, 13 and 15, as drive arm 52 rotates from the position in FIG. 13 to the position in FIG. 12 the shuttle frame 48 moves from the second predetermined position outwardly to full extension at the end of its path of travel and inwardly back to the second predetermined position. Through this movement, elongated inverted cam plate 68 again moves axially with respect to shuttle frame 48 so as to drive the reaches of the respective chain loops 84 in the opposite directions. As the shuttle frame 48 reciprocates through the zones adjacent the respective ends of shuttle path, one fork engaging member on each side of shuttle frame moves upward and the other moves downward. Selectively engaging a shuttle fork member 50 to an upwardly moving fork engaging member 88 lifts a container from a shelf of either the vertical lift or rotary storage carousel. At the other end of the shuttle path the direction of the fork engaging member 88 is reversed, and the descending fork engaging member lowers the associated shuttle fork member and the container thereon to a corresponding shelf at about the same level.

In the preferred embodiment of the selective mechanical lift means it is desirable to have a stabilizing means for preventing uneven forces from acting on the chain loops 84 on either side of shuttle frame 48. Generally, when the loads on the forks on each side of shuttle frame 48 are not identical, the difference in the loads would translate to elongated inverted cam plate 68 at the mounting slots 72 and attachment pins or bolts 74. If these loads are excessive, wear or binding or even unsymmetrical movement of ends 90 might result. To overcome the effect of uneven loads the chain loops 84 are locked together by an inverted cam plate stabilizing means. In the preferred embodiment the inverted cam plate stabilizing means comprises locking sprockets 92 over which chain loops 84 are trained. Locking sprockets 92 are fixedly attached to the remote ends of torsion axle 94 which extends transversely of and is rotatably mounted to shuttle frame 48. Locking sprockets 92 engage with chain loops 84 so that uneven loads are distributed between the respective chain loops through torsion axle 94.

FIGS. 16A through 21 diagrammatically show another portion of the preferred embodiment of the selective mechanical lift means for engaging a fork 50 with a fork engaging member 88. FIG. 17 shows a typical fork engaging member 88 having a plurality of engaging slots 96. An engaging slot 96 is provided in each fork engaging member 88 for each shuttle fork member 50 in the particular bank of shuttle forks. Thus, a given shuttle fork member 50 can be actuated by either of the fork engaging members 88 depending upon the timing of the engagement of the shuttle fork member with the fork engaging member. The engaging slots 96 are spaced apart about the same distance as the rows of shelves on the rotary storage carousel. At the lower end of each engaging slot 96 is a sill 98 which extends generally perpendicular to the long axis of the fork engaging member 88. At the upper end of each engaging slot 96 is a sloping releasing edge 100.

FIGS. 16, 18, 19, 20 and 21 diagrammatically show a separate fork engaging assembly 102 for each shuttle fork member 50. Each fork engaging assembly 102 is slidably mounted on shuttle frame 48 so that each fork engaging assembly 102 can move generally vertically independently of the other fork engaging assemblies in the same bank when engaged to a fork engaging member 88.

Figure 19:
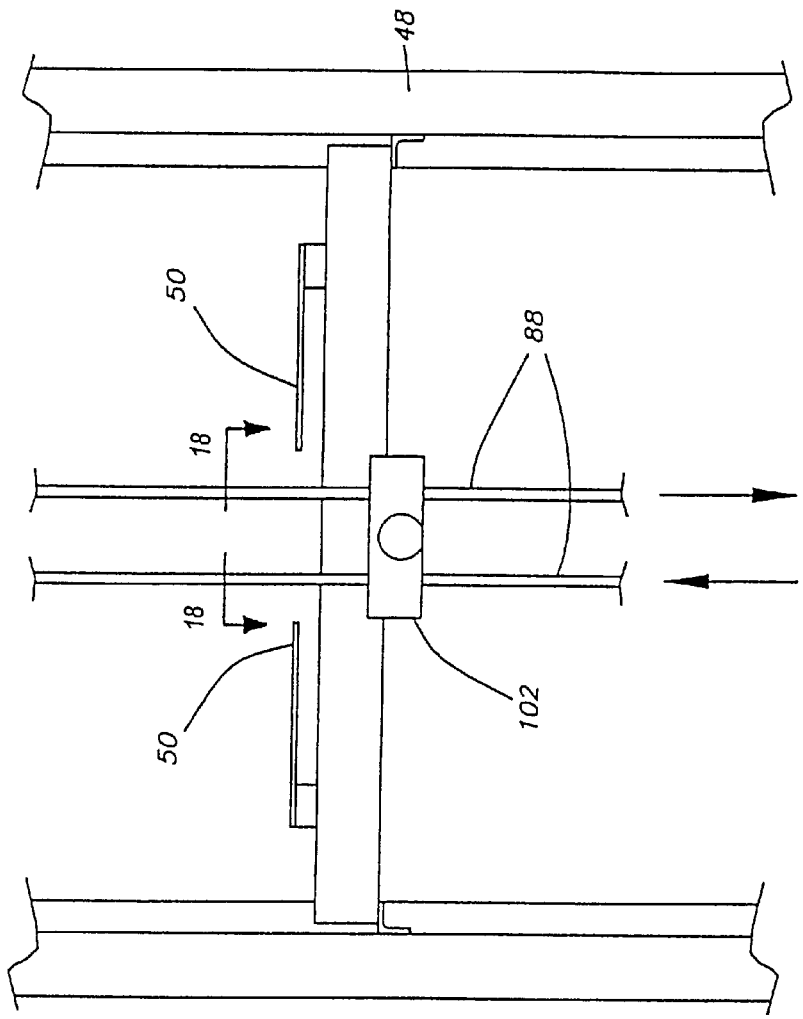
FIG. 19 is an elevational view of the embodiment of FIG. 18.
Figure 18:
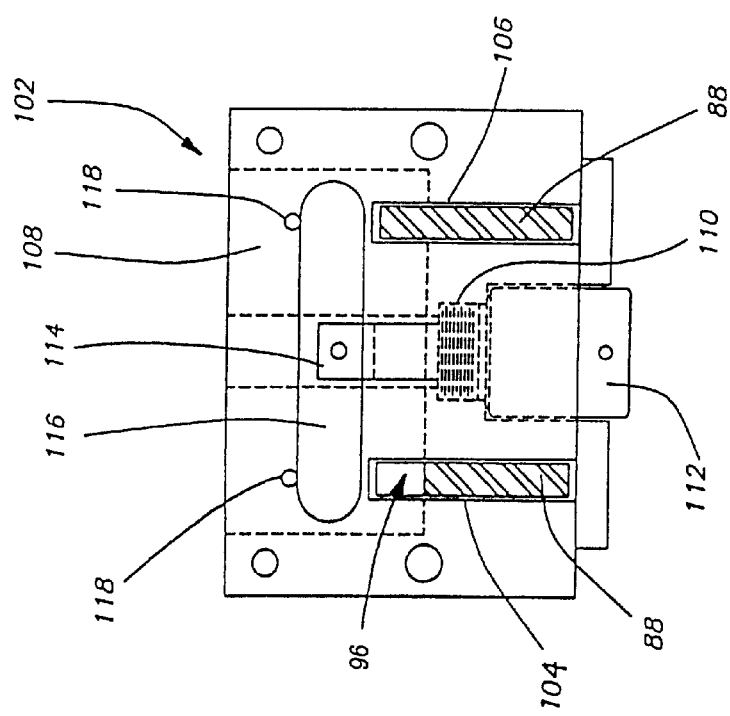
FIG. 18 is top view taken along line 18—18 in FIG. 19 of an embodiment of the selective lift means including a detente or toggle bar and solenoid disengaged from the fork engaging member.

FIGS. 18 and 20 show fork engaging assembly 102 having two clearance slots 104, and 106 in which two fork engaging members 88 are slidably received. In addition, each fork engaging assembly 102 includes an inner chamber 108 and a solenoid mounting hole 110 opening into inner chamber 108. Solenoid 112, having a toggle engaging end 114, is fixedly mounted in each mounting hole 110. Inside each inner chamber 108 there is positioned a detente or toggle bar 116 pivotably attached to solenoid toggle engaging end 114. Toggle stop tabs 118 limit the movement of toggle bar 116 when the solenoid 112 is in the disengaged position as shown in FIG. 18. When a fork engaging assembly is in the disengaged position as shown in FIG. 18, it remains at rest on shuttle frame 48 as fork engaging members 88 move up and down as indicated in FIG. 19. FIG. 20 shows solenoid 112 energized with toggle bar 116 in the engaged position. In the engaged position, toggle bar 116 enters an engaging slot 96 of a fork engaging member 88 as it is about to move upward. As fork engaging member 88 is moved upward, toggle bar 116 engages perpendicular sill 98 of engaging slot 96, whereby fork engaging assembly 102 is carried upward by fork engaging member 88, as shown in FIG. 21. It is important to the present invention that when it is desired to reverse the shuttle cycle, it is only necessary, for example, to change the timing of the actuation of detente or toggle bar 116 so that it will engage an engaging slot 96 in the other fork engaging member 88 at the other end of the shuttle path. Nothing more is required to effect reversal of the shuttle cycle.

Figure 22:
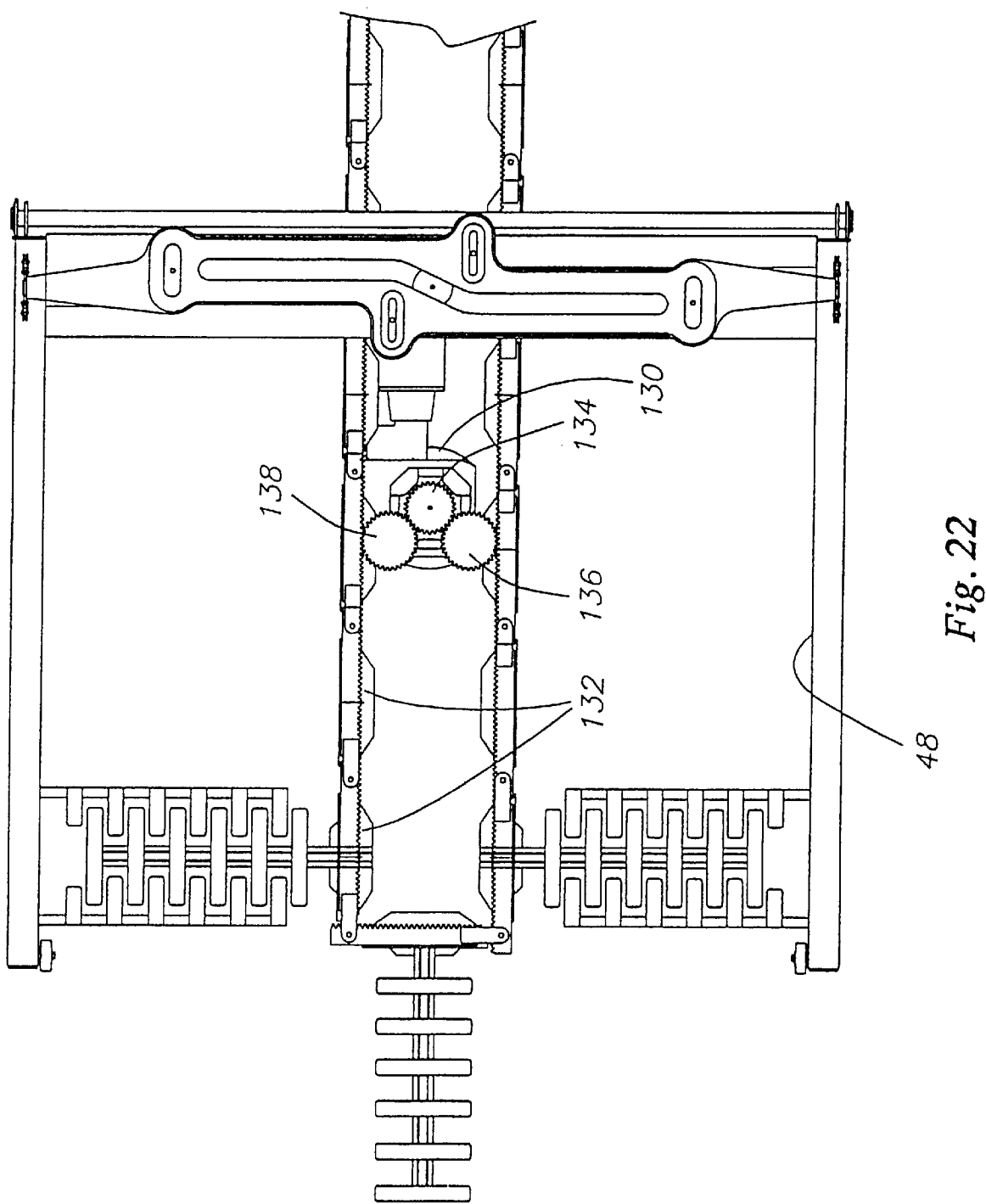
FIG. 22 is a diagrammatic plan view of an embodiment of the drive system mechanically and synchronously driving the shuttle and storage carousel
Figure 24:
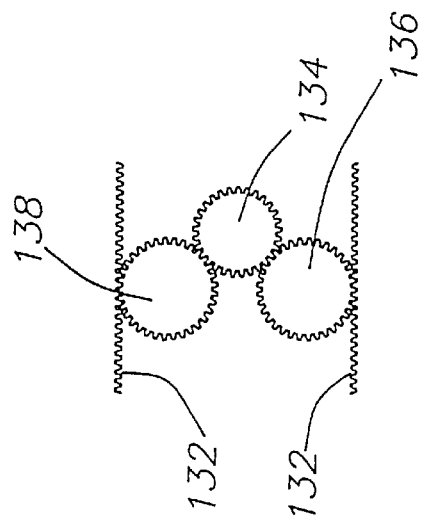
FIG. 24 is a diagrammatic plan view of the embodiment of the drive system of FIG. 22 showing the gear drive of the rotary storage carousel.
Figure 23:
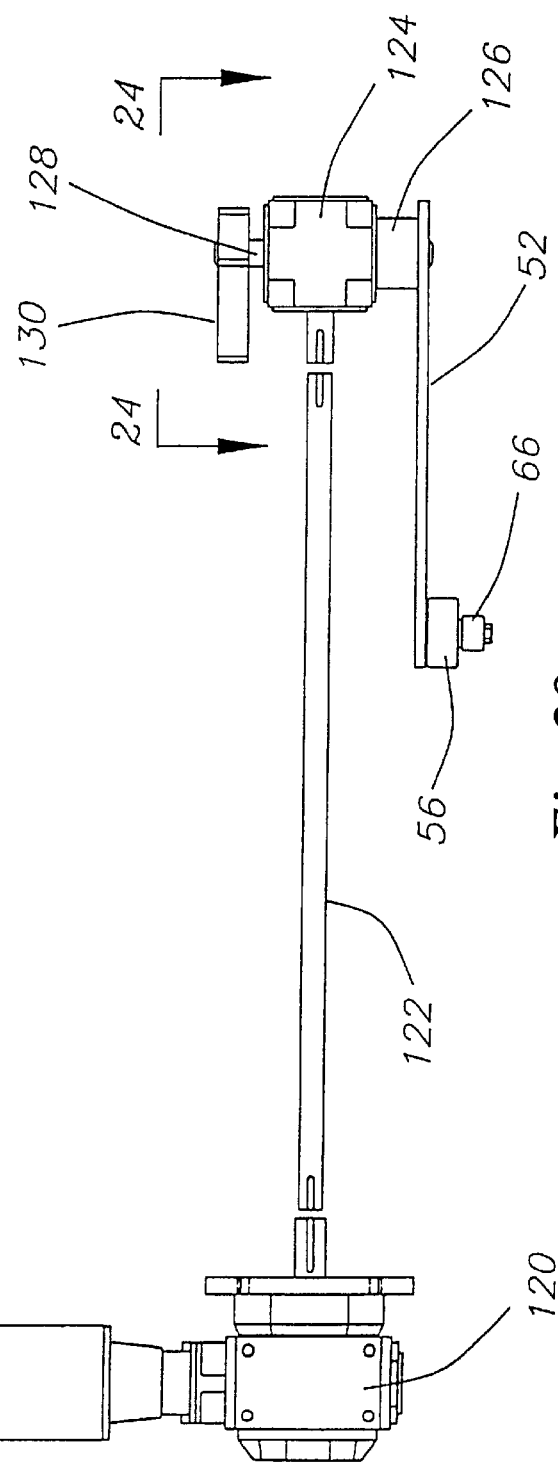
FIG. 23 is a diagrammatic side view of the embodiment of FIG. 22.

FIG. 23 diagrammatically illustrates a preferred embodiment of drive system 54 which is adapted to interlock and mechanically synchronize the movement of shuttle 16 with the movement of rotary carousel 12. Rotary power source 120, for example, an electric motor and gear box, drives shaft 122 which in turn drives gear box 124. Gear box 124 has first output shaft 126 to which drive arm 52 is mounted for rotation therewith. Drive arm 52, at its remote end carries coaxially mounted yoke cam follower 56 and forklift cam follower 66. Gear box 124 includes second output shaft 128 for driving carousel drive member 130. Carousel drive member 130 comprises a plurality of linear pinion gears or racks 132 mounted on the rotary storage carousel 12. Preferably, the linear pinion gears or racks 132 are attached to the rigid panels 24. Second output shaft 128 of gear box 124 drives rotating gear 134 which in turn drives the plurality of linear pinion gears or racks 132 through circular pinion gears 136 and 138. In a preferred embodiment, as shown in FIGS. 24 and 22, rotating gear 134 drives two intermediate pinion gears 136 and 138 which in turn drive the plurality of linear pinion gears or racks 132 to impart motion to rotary storage carousel 12. Generally, drive system 54 must be synchronized so that rotary storage carousel 12 moves a first predetermined distance, for example, the width of one rigid panel or rack 24, as shuttle frame 48 moves through one shuttle cycle, as defined by one revolution of drive arm 52. Thus, synchronization of drive system 54 is established, for example, by having rotary power source 122 drive gear box 126 which drives drive arm 52 through one revolution while advancing rotary storage carousel 12 the width of one rigid panel or rack 24. Referring to FIG. 22, synchronization of the drive system requires that when drive arm 52 is positioned so that shuttle 16 is at the end of its path adjacent rotary storage carousel 12, the rotary storage carousel is aligned by drive system 54 so that opposed columns of shelves 62 and 64 are intermeshingly aligned with opposed banks of shuttle fork members 48. It is to be understood that a wide variety of gear box ratios and gear teeth combinations can produce the desired synchronization, and that other systems of synchronization may be utilized.

Figure 25:
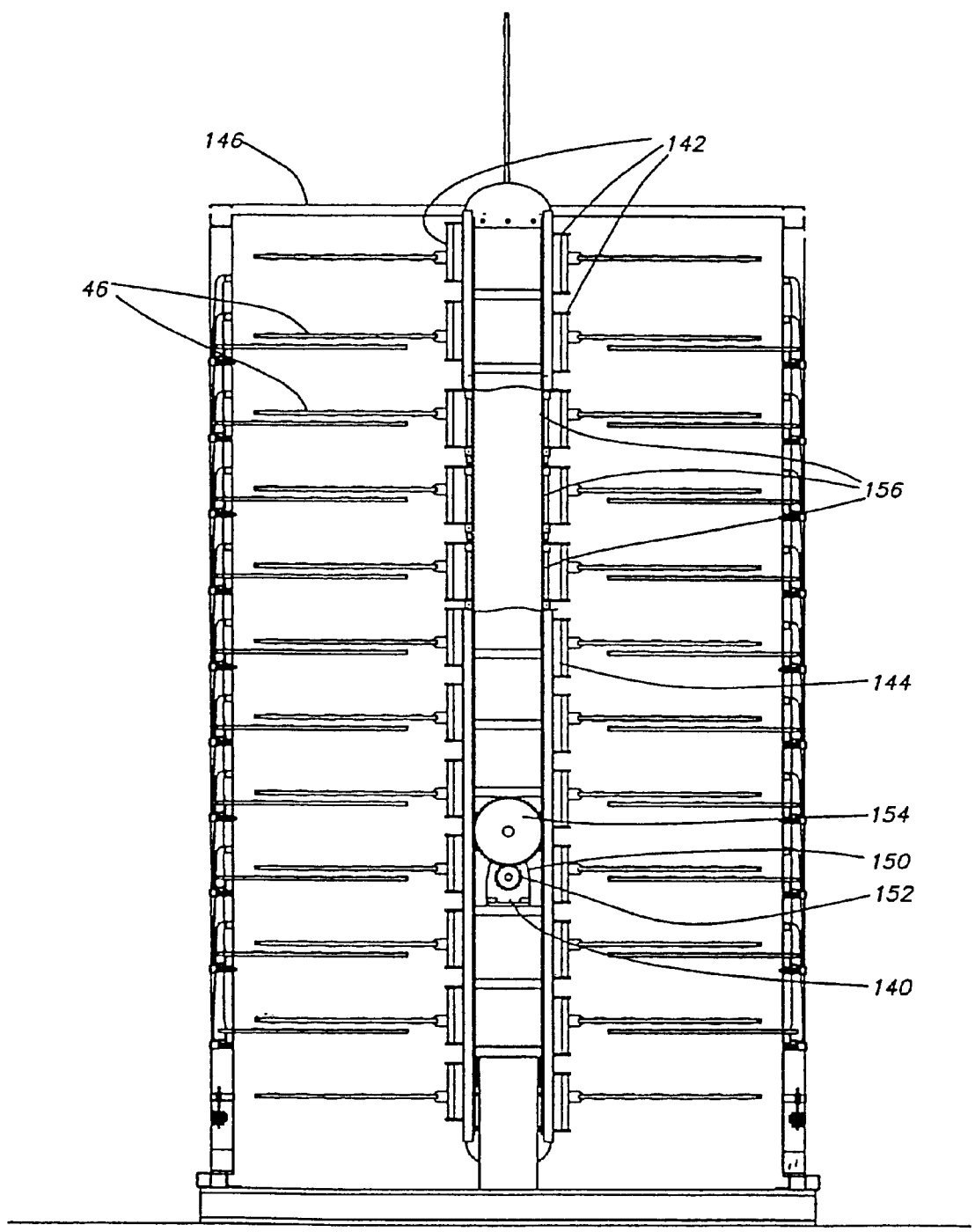
FIG. 25 is a diagrammatic elevational view of the separate drive system for the vertical lift.

In a preferred embodiment, vertical lift 14 is driven separately from drive system 54. FIG. 25 shows vertical lift 14 with its own dedicated vertical lift drive system 140. Each vertical lift shelf 46 is attached to a rigid link 142 and each rigid link 142 is pivotably attached to an adjacent rigid link forming a vertical continuous endless loop or second generally closed path 144. Vertical lift 14 comprises a vertical frame assembly 146 supporting the vertical continuous endless loop 144 of rigid links 142. Vertical lift drive system 140 comprises a vertical lift rotary power source 150 preferably mounted to vertical frame assembly 146 and driving pinion 152 which in turn drives gear 154. Each rigid link 142 has a linear pinion gear or rack 156 attached thereto in similar fashion as previously described with respect to the drive for the rotary storage carousel. Gear 154 drives the linear pinion gears or racks 156. Referring to FIG. 25, the intermittent motion of vertical lift 14 must be synchronized with the reciprocal motion of shuttle 16 so that when shuttle fork members 50 sweep past vertical lift shelves 46 each fork 50 clears the corresponding shelf 46. The shelves 46 are preferably substantially stationary at this phase in the shuttle cycle. A conventional Geneva drive, not illustrated is, for example, utilized to accomplish the intermittent motion of the shelves. During one complete shuttle cycle, the shelves 46 must move a predetermined distance. The distance moved by shelves 46 is generally at least equal to the distance between two shelves 46. However, vertical lift drive system 140 can also drive the vertical lift at any multiple distance between shelves 46 for one complete reciprocal cycle of shuttle 14. It is to be appreciated that the conventional microprocessor control system can control the vertical lift drive to run at any speed corresponding to any multiple distance between shelves 46 for one complete reciprocal cycle of shuttle 14. Hence, the speed at which vertical lift 14 can be driven is synchronized with the speed at which shuttle 14 reciprocates.

Figure 27:
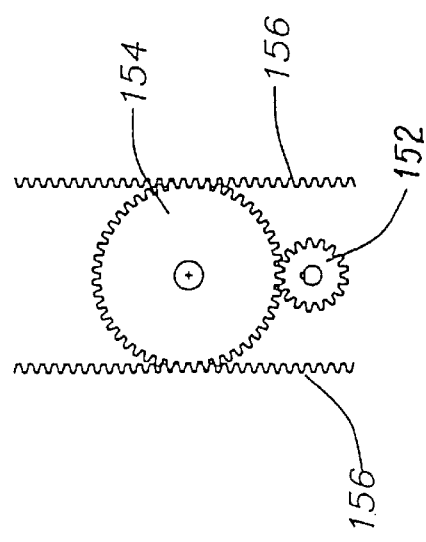
FIG. 27 is a diagrammatic top view of the embodiment of the vertical lift drive system of FIG. 26.
Figure 26:
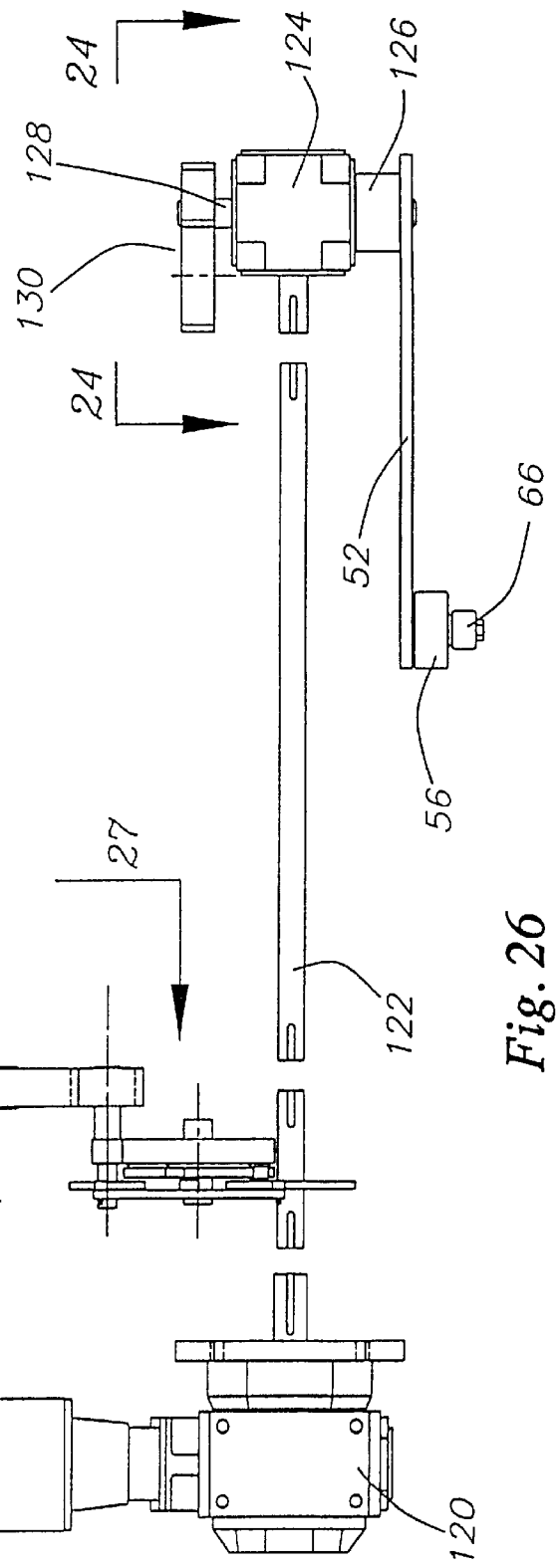
FIG. 26 is a diagrammatic side view of an embodiment of a common drive system driving the rotary storage carousel, the shuttle, and the vertical lift.

FIGS. 26 and 27 diagrammatically show another preferred embodiment where drive system 54 also drives and mechanically synchronizes movement of vertical lift 14 with the movement of shuttle 16 and rotary carousel 12. In FIG. 26 shaft 122 drives gear box 124 as discussed above, and drives vertical lift gear assembly 158. Vertical lift gear assembly 158 drives pinion 152, which as discussed above, drives gear 154, which in turn drivingly engages linear pinion gears or racks 156. In this embodiment, the number of shelves moved by vertical lift 14 during one shuttle cycle is predetermined by the speed of rotary power source 120 and the gear ratio of vertical lift gear assembly 158. It is to be appreciated that the gear ratio of vertical lift gear assembly 158 can be selected to drive vertical lift 14 at any speed corresponding to any multiple distance between shelves 46 for one complete reciprocal cycle of shuttle unit 16.

Figure 28:
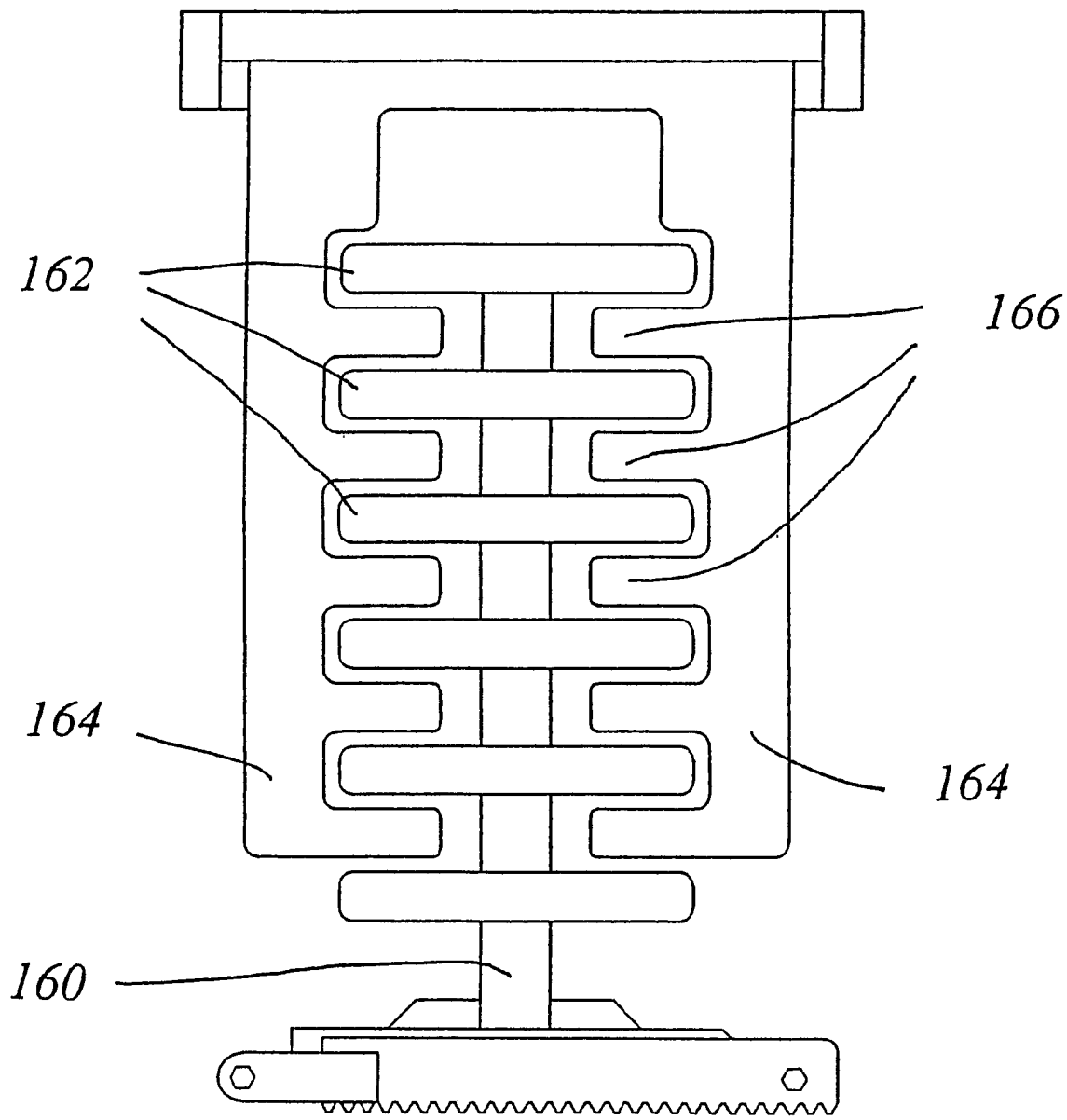
FIG. 28 is a diagrammatic plan view of an embodiment of the rotary storage carousel or vertical lift shelves intermeshed with the forks of the shuttle.

FIG. 28 shows an embodiment of the configuration of shelves 44 or 46 which intermesh and cooperate with shuttle fork members 50 of shuttle unit 16. Each shelf 44 or 46 comprises a narrow central extension 160 to which a plurality of spaced apart shelf fingers 162 are attached. Each fork 50 has two outwardly extending arms 164 with a plurality of fork fingers 166 extending generally perpendicular to outwardly extending arms 164. The shelf and fork fingers intermesh with one another. The configuration of the fork and shelf fingers determines the minimum container width which the storage system can handle. In the embodiment in FIG. 28, the percentage container width variance is, for example, approximately 80 percent. It is to be appreciated that modifications of the dimensions of narrow central extension 160, plurality of shelf fingers 162, outwardly extending arms 164, and plurality of matching fork fingers 166 can produce a variety of percentage container widths for storage system 10 including percentages greater than approximately 80.

The storage system according to the present invention can be controlled manually or automatically. In general, conventional microprocessor controls are preferred because such controls generally are more accurate, quicker and have greater capacity than manual systems. It is, however, possible to use other conventional control systems in place of or together with microprocessor control systems, if desired.

As will be appreciated by those skilled in the art, various mechanical elements, other than those preferred embodiments selected for illustration, may be employed, for example, as the fork actuation mechanisms, the shuttle yoke cams, the forklift cams, and the cam plates. Also, various mechanical elements other than those preferred embodiments selected for illustration herein can be utilized to effect the switching of the actuation of the fork members from one point in the shuttle cycle to another, all within the scope and spirit of the accompanying claims.

What has been described are preferred embodiments in which modifications and changes may be made without departing from the spirit and scope of the accompanying claims. obviously, many modifications and variations of the present invention are possible in light of the above teachings. It is therefore to be understood that, within the scope of the appended claims, the invention may be practiced otherwise than as specifically described.

What is claimed is:

1. A method of storing variously sized objects on carousel shelves of a multi-tiered rotary storage carousel structure, said method comprising:

placing said carousel structure in continuous motion along a closed path, said carousel structure including a plurality of said carousel shelves having generally flat horizontally extending upper surfaces adapted to provide the sole support for said variously sized objects on said carousel structure, each of said carousel shelves having substantially the same configuration;

establishing a transfer zone having first and second ends, said first and second ends being opposed to one another, said transfer zone being adjacent said carousel structure at said first end;

establishing an input-output system adjacent said transfer zone at said second end, said transfer zone being established between said carousel structure and said input-output system;

selecting a plurality of said variously sized objects, said selected plurality of variously sized objects being selected for storage on said carousel structure;

delivering said selected plurality of variously sized objects to said input-output system;

moving said selected plurality of variously sized objects through said input-output system and said transfer zone to said carousel structure; and placing said selected plurality of variously sized objects at rest on respective ones of said generally flat horizontally extending upper surfaces of said carousel shelves.

2. A method of storing variously sized objects on a multi-tiered rotary storage carousel structure as recited in claim 1 wherein said selected plurality of said various sized objects have a percentage container width variance greater than 25 percent.

3. A method of storing variously sized objects on carousel shelves of a multi-tiered rotary storage carousel structure, said variously sized objects generally having various widths and heights, said method comprising:

placing said carousel structure in continuous motion along a closed path, said carousel structure including a plurality of said carousel shelves having generally flat horizontally extending upper surfaces adapted to provide the sole support for said variously sized objects on said carousel structure;

establishing a transfer zone having first and second ends, said first and second ends being opposed to one another, said transfer zone being adjacent said carousel structure at said first end;

establishing an input-output system adjacent said transfer zone at said second end, said transfer zone being established between said carousel structure and said input-output system;

selecting a plurality of said variously sized object, said selected plurality of variously sized objects being selected for storage on said carousel structure;

delivering said selected plurality of variously sized objects to said input-output system;

moving said selected plurality of variously sized objects through said input-output system and said transfer zone to said carousel structure;

placing said selected plurality of variously sized objects at rest on respective ones of said generally flat horizontally extending upper surfaces of said carousel shelves;

providing a shuttle within said transfer zone adapted to transport said selected plurality of various sized objects to said storage carousel structure, said shuttle having generally horizontally positioned shuttle forks adapted to provide the entire support for said selected plurality of variously sized objects during said transport;

imparting generally horizontal reciprocal motion to said shuttle within said transfer zone; and selectively actuating transfer of said selected plurality of various sized objects from said shuttle forks to said carousel shelves of said storage carousel structure when said shuttle is positioned at said first end of said transfer zone.

4. A method of storing variously sized objects on a multi-tiered rotary storage carousel structure as recited in claim 3, wherein selectively actuating transfer of said selected plurality of variously sized objects is accomplished by:

vertically aligning said shuttle forks with said carousel shelves when said shuttle is at said first end of said transfer zone;

selectively vertically actuating said shuttle forks to intermeshingly pass through said carousel shelves-without interference when said shuttle is at said first end of said transfer zone, said actuation thereby transferring said selected plurality of variously sized objects from said shuttle forks to said carousel shelves.

5. A method of storing variously sized objects on a multi-tiered rotary storage carousel structure as recited in claim 4 wherein said shuttle forks intermeshing pass through said carousel shelves by:

providing a narrow central extension on each said carousel shelf having a plurality of spaced apart shelf fingers thereto, said narrow central extension and said spaced apart shelf fingers defining said generally flat horizontally extending upper surface; and providing two outwardly extending arms on each said shuttle fork, each said arm having a plurality of fork fingers, said extending arms and said fork fingers adapted to intermeshingly pass through said narrow central extension and said spaced apart shelf fingers of said shelves without interference when selectively vertically actuated.

6. A method of storing variously sized objects on a multi-tiered rotary storage carousel structure as recited in claim 3 wherein said generally horizontal reciprocal motion of said shuttle is synchronous with the continuous motion of said storage carousel structure.

7. A method of storing variously sized objects on a multi-tiered rotary storage carousel structure as recited in claim 3 wherein said shuttle forks and said carousel shelves are sized to provide said selected plurality of said variously sized objects to have a percentage container width variance greater than 25 percent.

* * * * *